(12) United States Patent
Maeda et al.

(10) Patent No.: US 7,974,761 B2
(45) Date of Patent: Jul. 5, 2011

(54) BRAKING-DRIVING FORCE CONTROL DEVICE OF VEHICLE

(75) Inventors: Yoshinori Maeda, Aichi-gun (JP); Kazuya Okumura, Suntou-gun (JP); Michitaka Tsuchida, Susono (JP); Yoshio Uragami, Mishima (JP); Kensuke Yoshizue, Susono (JP); Satoshi Ando, Fuji (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 726 days.

(21) Appl. No.: 11/817,510

(22) PCT Filed: Feb. 24, 2006

(86) PCT No.: PCT/JP2006/304024
§ 371 (c)(1),
(2), (4) Date: Aug. 31, 2007

(87) PCT Pub. No.: WO2006/093242
PCT Pub. Date: Sep. 8, 2006

(65) Prior Publication Data
US 2009/0012687 A1  Jan. 8, 2009

(30) Foreign Application Priority Data

Mar. 1, 2005 (JP) ................... 2005-056503

(51) Int. Cl.
*G06G 7/00* (2006.01)
*G06F 17/00* (2006.01)
(52) U.S. Cl. .............. 701/70; 701/1; 701/71; 701/72; 701/79; 701/80; 701/91; 303/140; 303/146; 303/148; 303/149; 303/150
(58) Field of Classification Search .......... 701/1, 70–72, 701/79–80, 91; 303/140, 146, 148–150
See application file for complete search history.

(56) References Cited

U.S. PATENT DOCUMENTS

| | | | |
|---|---|---|---|
| 6,418,369 B2 * | 7/2002 | Matsumoto et al. | 701/80 |
| 6,438,474 B1 * | 8/2002 | Tanaka et al. | 701/41 |

(Continued)

FOREIGN PATENT DOCUMENTS

JP  8 310366  11/1996
(Continued)

OTHER PUBLICATIONS

U.S. Appl. No. 11/916,073, filed Nov. 30, 2007, Uragami, et al.
U.S. Appl. No. 12/097,629, filed Jun. 16, 2008, Meada, et al.

*Primary Examiner* — Jack Keith
*Assistant Examiner* — Chuong P Nguyen
(74) *Attorney, Agent, or Firm* — Oblon, Spivak, McClelland, Maier & Neustadt, L.L.P.

(57) ABSTRACT

According to the present invention, when a target braking/driving force and a vehicle target yaw moment required to a vehicle cannot be achieved through a control of a braking/driving forces of wheels, in a rectangular coordinate of the braking/driving force and the yaw moment, a polygon indicating the maximum range of the braking/driving force and the yaw moment attainable by the braking/driving forces of the wheels, and an ellipse that crosses each side of the polygon and has a major axis and a minor axis aligning with the coordinate axis of the rectangular coordinate are set, for example. The target braking/driving force and the target yaw moment are modified to the values at the coordinate of the point, which is closer to the origin, of a point of intersection of a segment linking a point indicating the target braking/driving force and the target yaw moment and the origin, and the polygon, and a point of intersection of a segment linking a point indicating the target braking/driving force and the target yaw moment and the origin, and the ellipse.

12 Claims, 10 Drawing Sheets

U.S. PATENT DOCUMENTS

| | | | |
|---|---|---|---|
| 6,659,570 B2 * | 12/2003 | Nakamura | 303/146 |
| 2003/0195667 A1 * | 10/2003 | Tange et al. | 701/1 |
| 2008/0221766 A1 * | 9/2008 | Maeda et al. | 701/70 |
| 2009/0012685 A1 * | 1/2009 | Maeda et al. | 701/70 |
| 2009/0012686 A1 * | 1/2009 | Maeda et al. | 701/70 |
| 2009/0051216 A1 * | 2/2009 | Maeda et al. | 303/146 |
| 2009/0236905 A1 * | 9/2009 | Maeda et al. | 303/146 |
| 2010/0174463 A1 * | 7/2010 | Uragami et al. | 701/70 |

FOREIGN PATENT DOCUMENTS

| | | |
|---|---|---|
| JP | 9 309357 | 12/1997 |
| JP | 2000 168525 | 6/2000 |
| JP | 2000 190832 | 7/2000 |
| JP | 2000 344077 | 12/2000 |
| JP | 2002 046589 | 2/2002 |
| JP | 2002 178904 | 6/2002 |

* cited by examiner

FIG.7A
FIG.7B
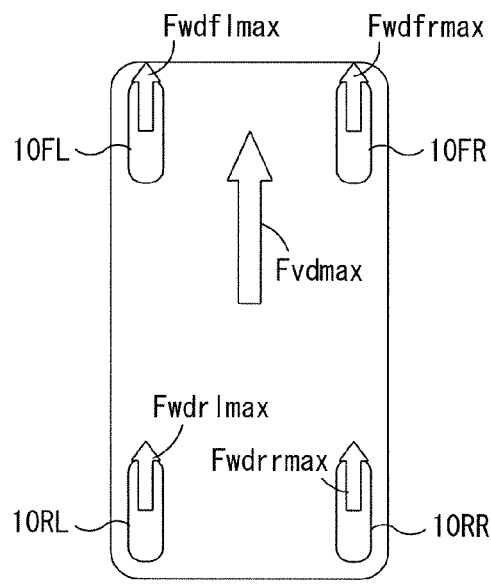
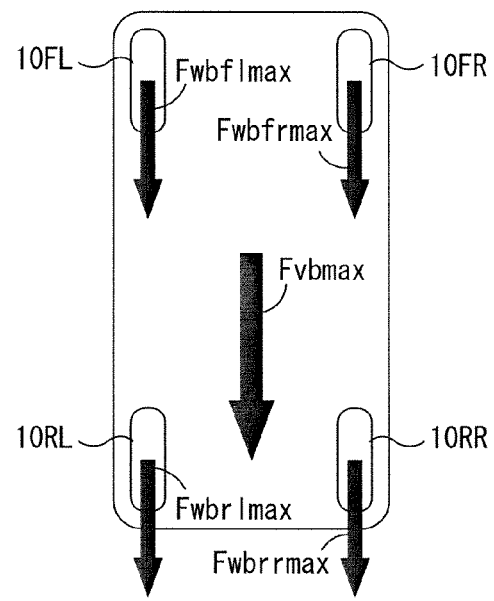
FIG.7C
FIG.7D
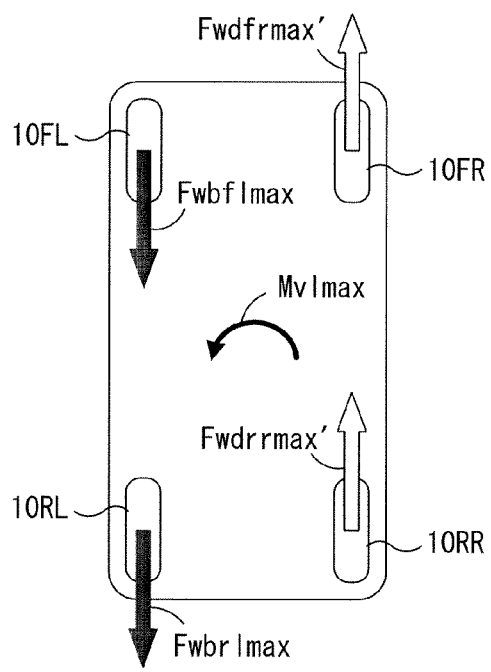
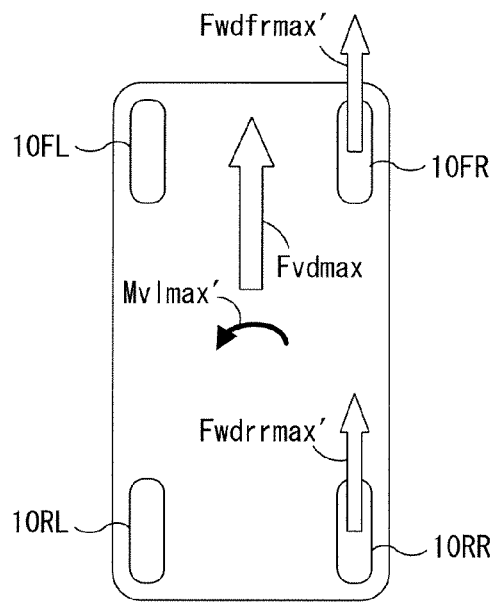

BRAKING-DRIVING FORCE CONTROL DEVICE OF VEHICLE

TECHNICAL FIELD

The present invention relates to a vehicle braking/driving force control apparatus, and more particularly to a vehicle braking/driving force control apparatus that controls braking/driving force of each wheel.

BACKGROUND ART

As one of braking/driving force control apparatuses for a vehicle, such as an automobile, there has conventionally been known a driving force control apparatus, as disclosed in Japanese Unexamined Patent Application No. HEI9-309357 for example, for performing a distribution control of driving force applied to right and left wheels so as to exert a required yaw moment to a vehicle. Further, there has already been known a braking force control apparatus that controls a vehicle braking/driving force and yaw moment by controlling braking forces of wheels so as to secure a vehicle running stability. This braking/driving force control apparatus can enhance running stability of a vehicle.

In general, the vehicle braking/driving force and yaw moment can be controlled through the control of the braking/driving forces of the wheels. However, there is a limitation in the braking/driving force that can be generated by each wheel. Therefore, there may be the case in which the braking/driving force and/or yaw moment required to the vehicle exceeds the value attainable by the control of the braking/driving forces of the wheels. This situation is not considered in the above-mentioned conventional braking/driving force control apparatus, and it is necessary to make an improvement on this point.

When the target braking/driving force and/or the target yaw moment required to the vehicle exceed the values attainable by the control of the braking/driving forces of the wheels, the target braking/driving force and/or the target yaw moment may be modified such that the target braking/driving force and the target yaw moment after the modification take the values that are attainable by the braking/driving forces of the wheels and has as greater magnitude as possible. In that case, if the target braking/driving force sharply changes, the target yaw moment after the modification sharply increases or decreases and if the target yaw moment sharply changes, the target braking/driving force after the modification sharply changes, resulting in that the vehicle running stability deteriorates and an occupant or occupants of the vehicle feel a sense of incongruity.

DISCLOSURE OF THE INVENTION

The present invention had been accomplished in view of the circumstance described above in the conventional vehicle braking/driving force control apparatus that is configured to control braking/driving force and yaw moment of the vehicle through the control of the braking/driving forces of wheels, and the main subject of the present invention is to achieve a braking/driving force and yaw moment required to the vehicle as much as possible even when the braking/driving force and/or the yaw moment required to the vehicle exceed the values attainable by the control of the braking/driving forces of the wheels, and to prevent sharp changes in the vehicle braking/driving force and in the yaw moment even if the target braking/driving force and/or the target yaw moment required to the vehicle sharply changes.

The above-mentioned main subject can be achieved by a vehicle braking/driving force control apparatus comprising braking/driving force applying means that can apply braking/driving forces to wheels; means for detecting an amount of driving operation by an occupant; means for calculating a vehicle target braking/driving force and a vehicle target yaw moment, which should be generated by the braking/driving forces of the wheels, on the basis of at least the amount of the driving operation by the occupant; modifying means for modifying the target braking/driving force and/or the target yaw moment, when the target braking/driving force and/or the target yaw moment cannot be achieved by the braking/driving forces of the wheels; and control means for controlling the braking/driving force applied to each wheel by the braking/driving force applying means such that the vehicle braking/driving force and the yaw moment by the braking/driving force of each wheel become the target braking/driving force after the modification and the target yaw moment after the modification, wherein the modifying means modifies the target braking/driving force and/or the target yaw moment to values, in a rectangular coordinate in which the vehicle braking/driving force and the yaw moment are defined as a coordinate axis, that are within the range of the vehicle braking/driving force and the vehicle yaw moment attainable by the braking/driving forces of the wheels and within an ellipse which has its center on the coordinate axis of the vehicle braking/driving force of the rectangular coordinate and has a major axis and minor axis aligning with the directions of the coordinate axes of the rectangular coordinate.

With this configuration, under the condition where the target braking/driving force and/or the target yaw moment cannot be achieved by the braking/driving forces of the wheels, the target braking/driving force and/or the target yaw moment are modified to values, in a rectangular coordinate in which the vehicle braking/driving force and the yaw moment are defined as a coordinate axis, that are within the range of the vehicle braking/driving force and the vehicle yaw moment attainable by the braking/driving forces of the wheels and within an ellipse which has its center on the coordinate axis of the vehicle braking/driving force of the rectangular coordinate and has a major axis and minor axis aligning with the directions of the coordinate axes of the rectangular coordinate. Therefore, even when the target braking/driving force and/or the target yaw moment cannot be achieved by the braking/driving forces of the wheels, the braking/driving force and the yaw moment close to the target braking/driving force and the target yaw moment can be achieved. Further, even when the target braking/driving force and/or the target yaw moment sharply change, the sharp changes in the vehicle yaw moment and vehicle braking/driving force can be prevented, whereby the fear of deteriorating the vehicle running stability or providing a sense of incongruity to an occupant or occupants of the vehicle can effectively be reduced.

In the above-described configuration, the ellipse may cross each side of a polygon that defines the range of the vehicle braking/driving force and the vehicle yaw moment attainable by the braking/driving forces of the wheels.

With this configuration, even when either of the target braking/driving force or the target yaw moment sharply changes, the sharp change in the vehicle yaw moment and the braking/driving force can be prevented.

In the above-described configuration, the diameter of the ellipse may be variably set in accordance with a road friction coefficient such that, when the road friction coefficient is small, the diameter of the ellipse becomes smaller compared to the case where the road friction coefficient is great.

With this configuration, it can be prevented that the modification of the target braking/driving force and/or the target yaw moment by the ellipse becomes excessive when the road friction coefficient is great, as well as it can be prevented that the modification of the target braking/driving force and/or the target yaw moment by the ellipse becomes insufficient when the road friction coefficient is small.

In the above-described configuration, the diameter of the ellipse may be variably set in accordance with a rate of change of the target braking/driving force and/or a rate of change of the target yaw moment in such a manner that, when the magnitude of the rate of change of the target braking/driving force and/or the magnitude of the rate of change of the target yaw moment are great, the diameter of the ellipse becomes smaller than that in the case in which the magnitude of the of the rate of change of the target braking/driving force and/or the magnitude of the rate of change of the target yaw moment are small.

With this configuration, it is prevented that, when the magnitude of the rate of change of the target braking/driving force and/or the magnitude of the rate of change of the target yaw moment are small, the target yaw moment and/or the target braking/driving force are excessively corrected, and it is prevent that, when the magnitude of the rate of change of the target braking/driving force and/or the magnitude of the rate of change of the target yaw moment are great, the target yaw moment after the modification and the target braking/driving force after the modification sharply change.

In the above-described configuration, the diameter of the ellipse may be variably set in accordance with a driving preference of an occupant.

With this configuration, the degree of the modification of the target braking/driving force and/or the target yaw moment by the ellipse can be changed in accordance with the driving preference of an occupant.

In the above-described configuration, the modifying means may determine the necessity of the achievement of the target braking/driving force according to a driving operation by an occupant, and when the necessity of the achievement of the target braking/driving force is high, the modifying means may reduce the degree of the modification of the target braking/driving force by the ellipse, compared to the case where the necessity of the achievement of the target braking/driving force is low.

With this configuration, it is effectively prevented that, when the necessity of the achievement of the target braking/driving force is low, the target braking/driving force sharply changes, and when the necessity of the achievement of the target braking/driving force is high, the fear of hindering the achievement of the target braking/driving force can effectively be reduced.

In the above-described configuration, the modifying means may determine the necessity of the achievement of the target yaw moment according to a driving operation by an occupant, and when the necessity of the achievement of the target yaw moment is high, the modifying means may reduce the degree of the modification of the target yaw moment by the ellipse, compared to the case where the necessity of the achievement of the target yaw moment is low.

With this configuration, it is effectively prevented that, when the necessity of the achievement of the target yaw moment is low, the target yaw moment sharply changes, and when the necessity of the achievement of the target yaw moment is high, the fear of hindering the achievement of the target yaw moment can effectively be reduced.

In the above-described configuration, in a rectangular coordinate in which the vehicle braking/driving force and the yaw moment are defined as coordinate axes, with a point of intersection of a straight line linking a point indicating the target braking/driving force and the target yaw moment and the origin of the rectangular coordinate, and a line indicating the greatest values of the vehicle braking/driving force and the yaw moment by the braking/driving forces of the wheels, being defined as a first target point, and a point of intersection of a straight line linking the point indicating the target braking/driving force and the target yaw moment and the origin of the rectangular coordinate, and the ellipse being defined as a second target point, the modifying means may set the values at the point, which is closer to the origin, of the first and the second target points to the target braking/driving force after the modification and the target yaw moment after the modification.

With this configuration, the ratio of the vehicle braking/driving force and the yaw moment surely coincides with the ratio of the target braking/driving force and the target yaw moment, and the vehicle braking/driving force and yaw moment by the braking/driving forces of the wheels take as greater value as possible in magnitude, with the result that the braking/driving force and the yaw moment required to the vehicle can be achieved as much as possible, and even when the target braking/driving force and/or the target yaw moment sharply change, it can effectively be prevented that the vehicle yaw moment and the braking/driving force sharply change.

In the above-mentioned configuration, the means for calculating a vehicle target braking/driving force and a vehicle target yaw moment may calculate the vehicle target braking/driving force and the vehicle target total yaw moment for causing the vehicle to stably run on the basis of at least the amount of the driving operation by an occupant, estimate a vehicle turning yaw moment due to a lateral force of each wheel on the basis of at least the amount of the driving operation by the occupant, and calculate the vehicle target yaw moment by subtracting the turning yaw moment from the target total yaw moment.

With this configuration, the vehicle target braking/driving force and the vehicle target yaw moment that should be generated by the braking/driving forces of the wheels can be surely and correctly calculated in just proportion on the basis of at least the amount of the driving operation by an occupant.

In the above-described configurations, the diameter of the ellipse aligning with the direction of the coordinate of the yaw moment may be variably set so as to become smaller when the magnitude of the rate of change of the target braking/driving force is great, compared to the case in which the magnitude of the rate of change of the target braking/driving force is small.

In the above-described configurations, the diameter of the ellipse aligning with the direction of the coordinate of the braking/driving force may be variably set so as to become smaller when the magnitude of the rate of change of the target yaw moment is great, compared to the case in which the magnitude of the rate of change of the target yaw moment is small.

In the above-described configurations, the vehicle may comprise vehicle responsiveness setting means that variably sets a vehicle responsiveness to a driving operation made by an occupant, wherein the diameter of the ellipse may be variably set in accordance with the vehicle responsiveness set by the vehicle responsiveness setting means in such a manner that, when the vehicle responsiveness set by the vehicle responsiveness setting means is high, the diameter of the ellipse becomes greater than that in case where the vehicle responsiveness set by the vehicle responsiveness setting means is low.

In the above-mentioned configurations, the braking/driving force applying means may independently apply braking/driving force to each wheel.

In the above-mentioned configurations, the braking/driving force applying means may apply independently a braking force to each wheel, and apply a driving force from driving means, which is common to right and left wheels, to the right and left wheels in such a manner that the distribution of the driving forces to the right and left wheels is variable.

In the above-described configurations, the ellipse may cross each side of the polygon, which defines the range of the vehicle braking/driving force and the vehicle yaw moment attainable by the braking/driving forces of the wheels, at two points.

In the above-described configurations, the ellipse may have its center at the origin of the rectangular coordinate, wherein the major axis and the minor axis may align with the coordinate axes of the rectangular coordinate.

In the above-described configurations, the magnitude of the greatest vehicle braking force attainable by the braking/driving forces of the wheels may be greater than the magnitude of the greatest vehicle driving forces attainable by the braking/driving forces of the wheels, and the center of the ellipse may be positioned on the coordinate axis of the braking/driving force of the rectangular coordinate at the side of the braking force with respect to the origin of the rectangular coordinate.

In the above-described configurations, when the magnitude of the amount of the steering operation by an occupant and its rate of change are small, the modifying means may reduce the degree of the modification of the target braking/driving force by the ellipse, compared to the case in which the magnitude of the amount of the steering operation by an occupant and its rate of change are great, and alternatively, when the magnitude of the amount of the acceleration/deceleration operation by an occupant and its rate of change are great, the modifying means may reduce the degree of the modification of the target braking/driving force by the ellipse, compared to the case in which the magnitude of the amount of the acceleration/deceleration operation by an occupant and its rate of change are small.

In the above-described configurations, when the magnitude of the amount of the acceleration/deceleration operation by an occupant and its rate of change are small, the modifying means may reduce the degree of the modification of the target yaw moment by the ellipse, compared to the case in which the magnitude of the amount of the acceleration/deceleration operation by an occupant and its rate of change are great, and alternatively, when the magnitude of the amount of the steering operation by an occupant and its rate of change are great, the modifying means may reduce the degree of the modification of the target yaw moment by the ellipse, compared to the case in which the magnitude of the amount of the steering operation by an occupant and its rate of change are small.

In the above-mentioned configurations, the line indicating the greatest values of the vehicle braking/driving force and the vehicle yaw moment may be determined by the greatest value of the vehicle driving force, the greatest value of the vehicle braking force, the greatest value of the vehicle yaw moment in the leftward turning direction and the greatest value of the vehicle yaw moment in the rightward turning direction.

In the above-mentioned configurations, the line indicating the greatest values of the vehicle braking/driving force and the vehicle yaw moment may be variably set in accordance with a road friction coefficient. In the above-mentioned configurations, the means for applying driving force may comprise means for applying common driving force to the right and left wheels, means for controlling the distribution of the driving force to the front and rear wheels, and means for applying a braking force to each wheel independently.

In the above-mentioned configurations, the means for applying driving force may comprise means for applying common driving force to the right and left front wheels, and means for applying common driving force to the right and left rear wheels.

In the above-mentioned configurations, the means for applying driving force may comprise means for applying common driving force to the right and left front wheels and the right and left rear wheels, means for controlling the distribution of the driving force to the front and rear wheels, means for controlling the distribution of the driving force to the right and left front wheels, and means for controlling the distribution of the driving force to the right and left rear wheels.

In the above-mentioned configurations, the means for applying driving force may comprise an electric motor generator.

In the above-mentioned configurations, the electric motor generator may perform regenerative braking upon the braking.

In the above-mentioned configurations, the means for calculating the vehicle target braking/driving force and the vehicle target yaw moment may calculate a vehicle target longitudinal acceleration and a vehicle target yaw rate for stably running the vehicle on the basis of at least the amount of the driving operation by an occupant, and calculate the vehicle target driving/braking force and the vehicle target total yaw moment on the basis of the vehicle target longitudinal acceleration and the vehicle target yaw rate.

In the above-mentioned configurations, the control means may calculate the target braking/driving force of each wheel on the basis of the vehicle target braking/driving force, the vehicle target yaw moment, and the distribution ratio of the braking/driving force to the front and rear wheels, and control the braking/driving force applied to each wheel on the basis of the target braking/driving force of each wheel.

BRIEF DESCRIPTION OF THE DRAWINGS

FIG. 7 is an explanatory view for explaining various cases of the relationship between a braking/driving force of each wheel and a vehicle braking/driving force and the relationship between a braking/driving force of each wheel and a vehicle yaw moment in the second embodiment;

BEST MODE FOR CARRYING OUT THE INVENTION

Some preferred embodiments of the present invention will be explained in detail with reference to the accompanying drawings.

First Embodiment

Figure 1:
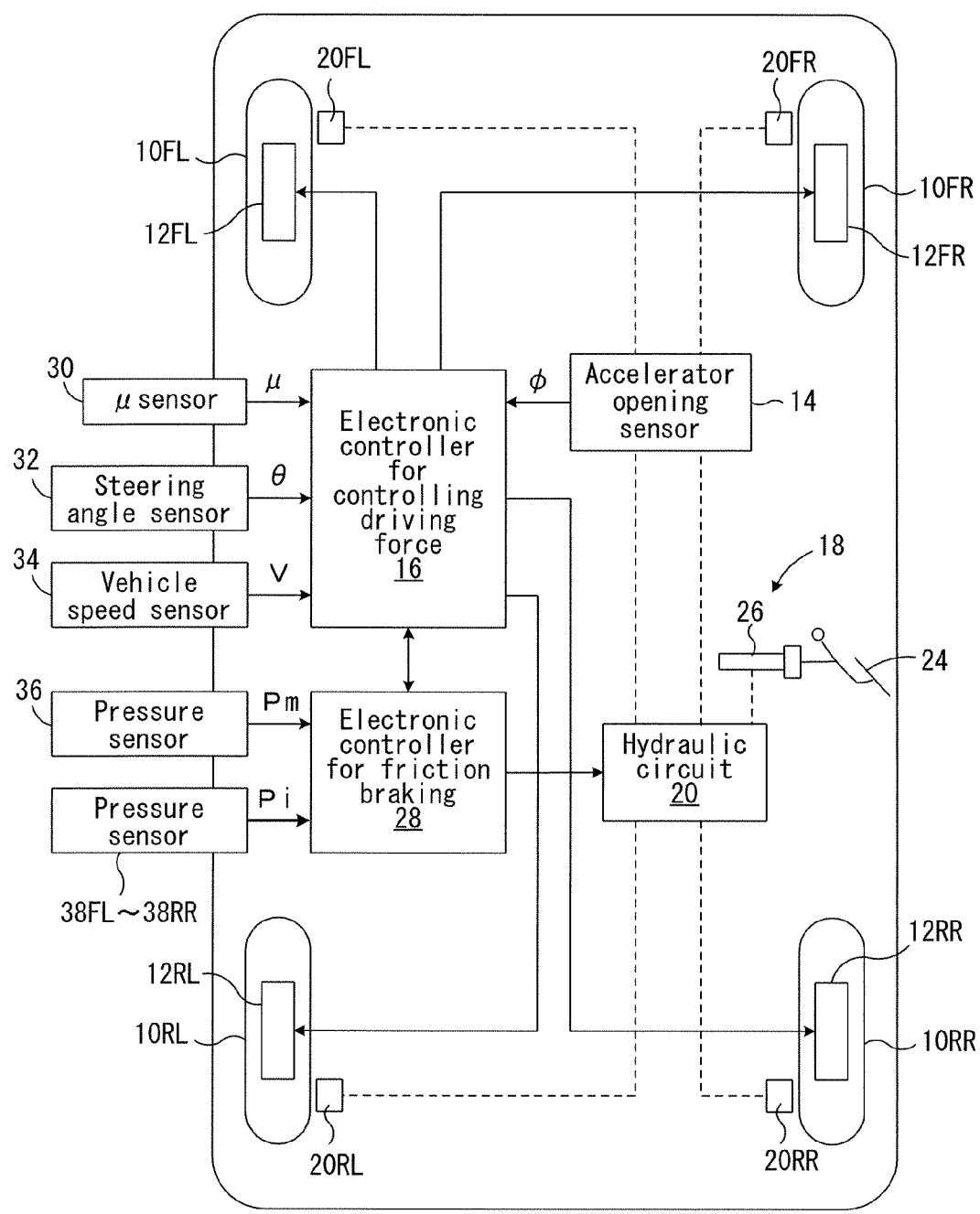
FIG. 1 is a schematic block diagram showing a braking/driving force control apparatus applied to a four-wheel-drive vehicle of a wheel-in-motor type according to a first embodiment of the present invention.

FIG. 1 is a schematic block diagram showing a braking/driving force control apparatus applied to a four-wheel-drive vehicle of a wheel-in-motor type according to a first embodiment of the present invention.

In FIG. 1, numerals 10FL and 10FR respectively represent left and right front wheels that are steering wheels, and numerals 10RL and 10RR respectively represent left and right rear wheels that are non-steering wheels. Electric motor generators 12FL and 12FR that are in-wheel motors are incorporated into the left and right front wheels 10FL and 10FR respectively, whereby the left and right front wheels 10FL and 10FR are driven by the electric motor generators 12FL and 12FR. The electric motor generators 12FL and 12FR also function as regenerative electric generators for each of the left and right front wheels upon the braking, so that they generate regenerative braking force.

Similarly, electric motor generators 12RL and 12RR that are in-wheel motors are incorporated into the left and right rear wheels 10RL and 10RR respectively, whereby the left and right front wheels 10RL and 10RR are driven by the electric motor generators 12RL and 12RR. The electric motor generators 12RL and 12RR also function as regenerative electric generators for each of the left and right rear wheels upon the braking, so that they generate regenerative braking force.

The driving force from each of the electric motor generators 12FL to 12RR is controlled by an electronic controller 16 for controlling driving force on the basis of an accelerator opening φ that is a step-on amount of an accelerator pedal, that is not shown in FIG. 1, detected by an accelerator opening sensor 14. The regenerative braking force from each of the electric motor generators 12FL to 12RR is also controlled by the electronic controller 16 for controlling driving force.

Although not shown in FIG. 1 in detail, the electronic controller 16 for controlling driving force is composed of a microcomputer and a driving circuit, wherein the microcomputer may have a general configuration to include, for example, a CPU, ROM, RAM, and input/output port device, those of which are interconnected with one another via a bi-directional common bus. In a normal running, electric power charged in a battery, which is not shown in FIG. 1, is supplied to each of the electric motor generators 12FL to 12RR, and upon the deceleration and braking of the vehicle, the electric power generated by the regenerative braking by each of the electric motor generators 12FL to 12RR is charged to the battery via the driving circuit.

The friction braking forces of the left and right front wheels 10FL and 10FR and the left and right rear wheels 10RL and 10RR are controlled by controlling braking pressures of corresponding wheel cylinders 22FL, 22FR, 22RL and 22RR by a hydraulic circuit 20 in a friction braking device 18. Although not shown in the figure, the hydraulic circuit 20 includes a reservoir, oil pump, and other various valve devices. In a normal situation, the braking pressure of each wheel cylinder is controlled in accordance with the step-on amount of the brake pedal 24 by a driver and the pressure of a master cylinder 26 that is driven in accordance with the step-on operation of the brake pedal 24. It is controlled as necessary through the control of the oil pump or various valve devices by an electronic controller 28 for controlling braking force, regardless of the step-on amount of the brake pedal 24 by a driver.

Although not shown in FIG. 1 in detail, the electronic controller 18 for controlling braking force is also composed of a microcomputer and a driving circuit, wherein the microcomputer may have a general configuration to include, for example, a CPU, ROM, RAM, and input/output port device, those of which are interconnected with one another via a bi-directional common bus.

Inputted to the electronic controller 16 for controlling driving force are a signal indicating a road friction coefficient μ from a μ sensor 30; a signal indicating a steering angle θ from a steering angle sensor 32; and a signal indicating a vehicle speed V from a vehicle speed sensor 34, in addition to the signal indicating the accelerator opening φ from the accelerator opening sensor 14. Inputted to the electronic controller 28 for controlling braking force are a signal indicating a master cylinder pressure Pm from a pressure sensor 36 and signals indicating braking pressures (wheel cylinder pressures) Pbi (i=fl, fr, rl, rr) of corresponding wheels from pressure sensors 38FL to 38RR. The electronic controller 16 for controlling driving force and the electronic controller 28 for controlling braking force exchange signals with each other according to need. Note that the steering angle sensor 32 detects a steering angle θ with the leftward turning direction of the vehicle defined as a positive.

The electronic controller 16 for controlling driving force calculates a vehicle target longitudinal acceleration Gxt on the basis of the accelerator opening φ and the master cylinder pressure Pm, which indicate an amount of acceleration/deceleration operation by a driver, and calculates a target yaw rate γt of the vehicle on the basis of the steering angle θ, which is an amount of steering operation by a driver, and the vehicle speed V through a manner well-known in this technical field. Then, the electronic controller 16 for controlling driving force calculates a target braking/driving force Fvn that is required to the vehicle on the basis of the vehicle target longitudinal acceleration Gxt, and calculates a target total yaw moment Mvnt required to the vehicle on the basis of the vehicle target yaw rate γt.

The electronic controller 16 for controlling driving force calculates the vehicle slip angle β with a manner well-known in this technical field, calculates the slip angle α of the left and right front wheels on the basis of the vehicle slip angle β and the steering angle θ, and calculates a vehicle turning yaw moment Ms due to a lateral force of each wheel on the basis of the slip angle α. Then, the electronic controller 16 for controlling driving force calculates the value obtained by subtracting the turning yaw moment Ms from the vehicle target total yaw moment Mvnt as the vehicle target yaw moment Mvn, required to the vehicle, through the control of the braking/driving force of each wheel.

The electronic controller 16 for controlling driving force further calculates the vehicle maximum driving force Fvdmax and the vehicle maximum braking force Fvbmax attainable by the braking/driving forces of the wheels on the basis of the road friction coefficient μ, and calculates the vehicle maximum yaw moment Mvlmax in the leftward turning direction and the vehicle maximum yaw moment Mvrmax in the rightward turning direction attainable by the braking/driving forces of the wheels on the basis of the road friction coefficient μ.

Figure 2A:
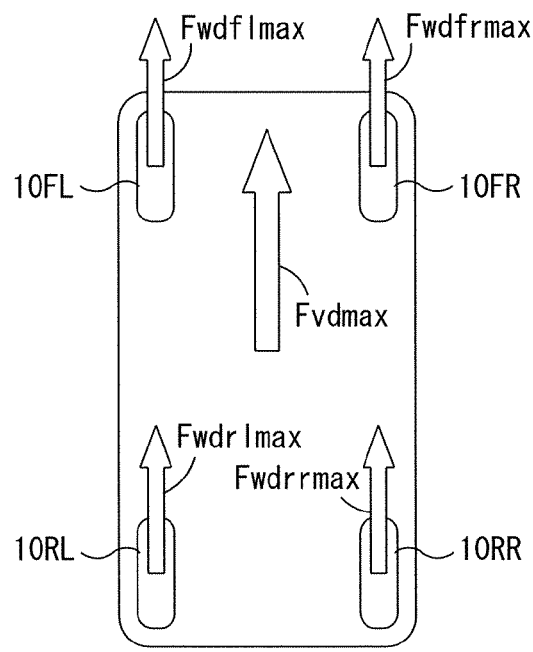
FIG. 2 is an explanatory view for explaining various cases of the relationship between braking/driving force of each wheel and a vehicle braking/driving force and the relationship between braking/driving force of each wheel and a vehicle yaw moment.
Figure 2B:
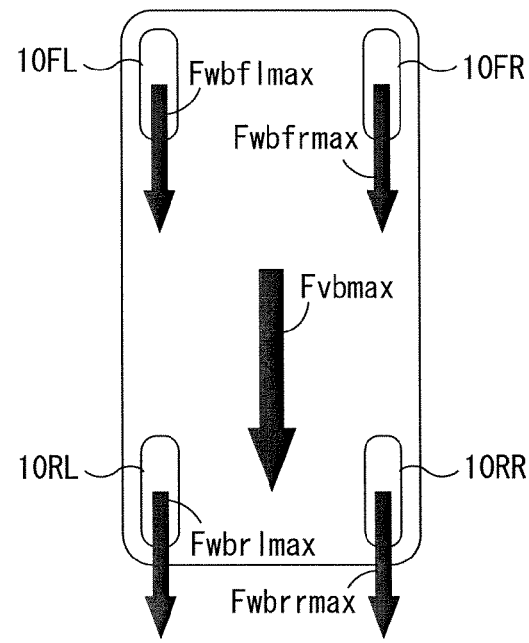

As shown in FIG. 2A, supposing that the vertical load and the friction coefficients to the road surface of the wheels are the same, and the sizes of the friction circles of the wheels are the same, the vehicle maximum driving force Fvdmax under the condition where the yaw moment by the braking/driving forces of the wheels is not acted on the vehicle is achieved when the braking/driving forces Fwxfl and Fwxfr of the left and right front wheels 10FL and 10FR are the maximum driving forces Fwdflmax and Fwdfrmax and the braking/driving forces Fwxrl and Fwxrr of the left and right rear wheels 10RL and 10RR are the maximum driving forces Fwdrlmax and Fwdrrmax. Similarly, as shown in FIG. 2B, the vehicle maximum braking force Fvbmax under the condition where the yaw moment by the braking/driving forces of the wheels is not acted on the vehicle is achieved when the braking/driving forces Fwxfl and Fwxfr of the left and right front wheels 10FL and 10FR are the maximum braking forces Fwbflmax and Fwbfrmax and the braking/driving forces Fwxrl and Fwxrr of the left and right rear wheels 10RL and 10RR are the maximum braking forces Fwbrlmax and Fwbrrmax.

Figure 2C:
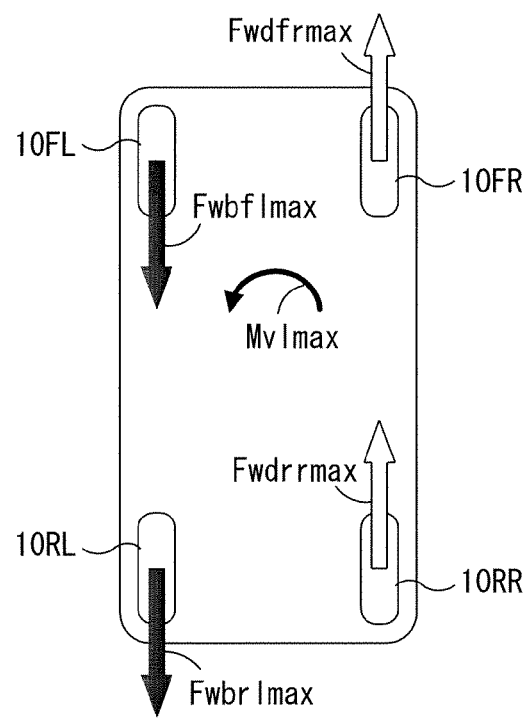
Figure 2D:
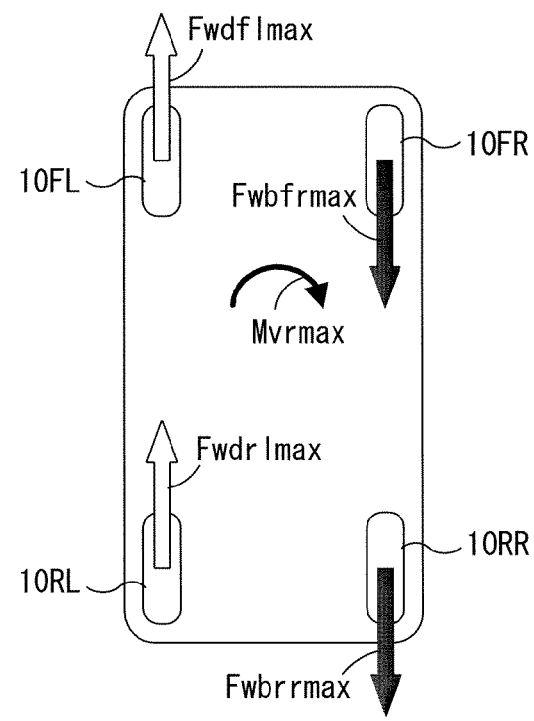

As shown in FIG. 2C, the vehicle maximum yaw moment Mvlmax in the leftward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum braking forces Fwbflmax and Fwbrlmax and the braking/driving forces Fwxfr and Fwxrr of the front right and rear right wheels 10FR and 10RR are the maximum driving forces Fwdfrmax and Fwdrrmax. Similarly, as shown in FIG. 2D, the vehicle maximum yaw moment Mvrmax in the rightward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum driving forces Fwdflmax and Fwdrlmax and the braking/driving forces Fwxfr and Fwxrr of the front right and rear right wheels 10FR and 10RR are the maximum braking forces Fwbfrmax and Fwbrrmax.

In case where the output torque of each of the electric motor generators 12FL to 12RR is sufficiently great, the maximum driving force and the maximum braking force of each wheel are determined by the road friction coefficient μ, so that, with the vehicle accelerating direction and vehicle leftward turning direction defined as positive, the following relationships are established between the maximum driving force and the maximum braking force of each wheel, the vehicle maximum driving force and the vehicle maximum braking force, and the vehicle maximum yaw moment in the leftward turning direction and the vehicle maximum yaw moment in the rightward turning direction.

$$Fwdflmax = Fwdfrmax = -Fwbflmax = -Fwbfrmax$$

$$Fwdrlmax = Fwdrrmax = -Fwbrlmax = -Fwbrrmax$$

$$Fvdmax = -Fvbmax$$

$$Mvlmax = -Mvrmax$$

Since the maximum driving force Fwdimax and the maximum braking force Fwbimax (i=fl, fr, rl, rr) of each wheel are determined by the road friction coefficient μ, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the road friction coefficient μ. Accordingly, if the road friction coefficient μ is found, the vehicle maximum driving force Fvdmax and the other aforesaid values can be estimated.

Figure 4A:
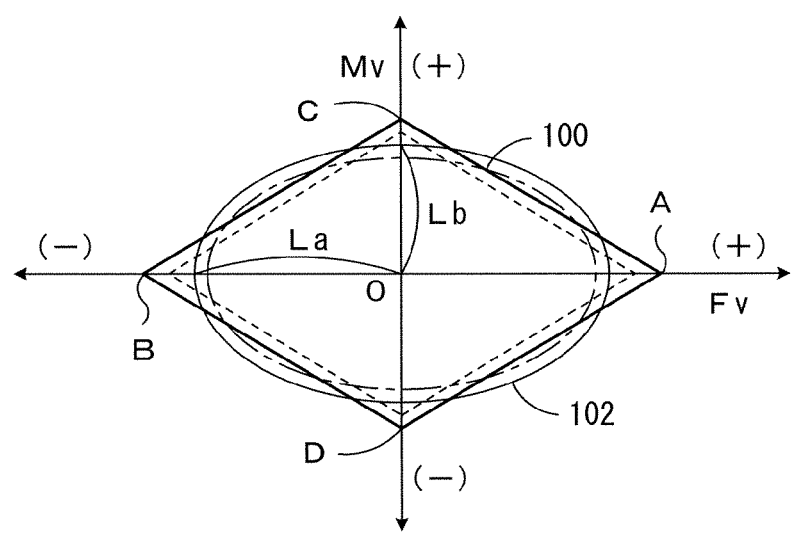
FIG. 4A is a graph showing the range, that can be achieved by the braking/driving forces of the wheels, of the vehicle braking/driving force and vehicle yaw moment in the first embodiment.

As shown in FIG. 4A, in a rectangular coordinate with the vehicle braking/driving force Fvx as abscissa and the vehicle yaw moment Mv as ordinate, the vehicle braking/driving force Fvx and the vehicle yaw moment Mv that can be achieved by the control of the braking/driving force of each wheel take values within a diamond quadrangle 100 decided by the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction.

Figure 4B:
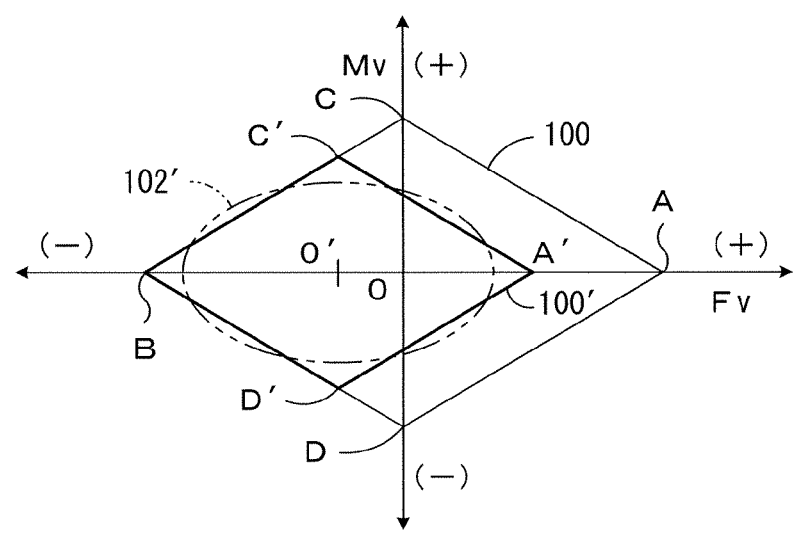
FIG. 4B is a graph showing the range, that can be achieved by the braking/driving forces of the wheels, of the vehicle braking/driving force and the vehicle yaw moment in a vehicle in which only front wheels or only rear wheels are driven in the first embodiment.

Notably, in FIG. 4, points A to D correspond to the cases A to D in FIG. 2, wherein the coordinates at the points A to D are (Fvdmax, 0), (Fvbmax, 0), (0, Mvlmax), and (0, Mvrmax), respectively. As shown by a broken line in FIG. 4A, the quadrangle 100 becomes small as the road friction coefficient μ decreases. Further, as the steering angle θ increases, the lateral force of front left and front right wheels, that are steering wheels, increases, so that the allowance of the longitudinal force becomes small. Therefore, the quadrangle 100 becomes small as the magnitude of the steering angle θ increases.

In the illustrated first embodiment, as shown in FIGS. 4 and 5, the electronic controller 16 for controlling driving force sets an ellipse 102 whose center is the origin O of the rectangular coordinate, and whose major axis La (radius along the major axis) and minor axis Lb (radius along the minor axis) agree with the abscissa and the ordinate respectively of the rectangular coordinate, and which crosses each side of the quadrangle 100. The major axis La and the minor axis Lb are variably set to the values not more than Fvdmax and Mvlmax, respectively, in accordance with the road friction coefficient, in such a manner that, when the road friction coefficient is small, the major axis La and the minor axis Lb take smaller values compared to the case where the road friction coefficient is great. The major axis La is variably set, in accordance with the magnitude of the rate of change of the target yaw moment Mvn, so as to be smaller as the magnitude of the rate of change of the target yaw moment Mvn is great, while the minor axis Lb is variably set, in accordance with the magnitude of the rate of change of the target braking/driving force Fvn, so as to be smaller as the magnitude of the rate of change of the target braking/driving force Fvn is great.

It is to be noted that the dimensional relationship of two diagonal lines of the quadrangle 100 and which axis of the ellipse, i.e. the major axis La or the minor axis Lb is along the abscissa or the ordinate depend upon the calibrating manner of the abscissa and ordinate. Therefore, the shape of the quadrangle 100 and the shape of the ellipse 102 depend upon the calibrating manner of the abscissa and ordinate.

When the vehicle target braking/driving force Fvn and the vehicle target yaw moment Mvn take values within the quadrangle 100 and within the ellipse 102, the electronic controller 16 for controlling driving force sets the vehicle target braking/driving force Fvt after the modification and the vehicle target yaw moment Mvt after the modification to the target braking/driving force Fvn and the target yaw moment Mvn, respectively.

On the other hand, when the vehicle target braking/driving force Fvn and the vehicle target yaw moment Mvn take values outside the quadrangle 100 or outside the ellipse 102, the electronic controller 16 for controlling driving force calculates the target braking/driving force Fvt after the modification and the target yaw moment Mvt after the modification in such a manner that the ratio of the vehicle target braking/driving force Fvt after the modification and the vehicle target yaw moment Mvt after the modification becomes the ratio of the target braking/driving force Fvn and the target yaw moment Mvn, and the target braking/driving force Fvt after the modification and the target yaw moment Mvt after the modification take the values greatest in magnitude within the quadrangle 100 and the within the ellipse 102.

Supposing that the longitudinal distribution ratio of the vehicle braking/driving force Fv to the rear wheels is defined as Kr (constant of 0<Kr<1), and the vehicle tread is defined as Tr, the following equations 1 to 3 are established.

$$Fwxfl + Fwxfr + Fwxrl + Fwxrr = Fvt \quad (1)$$

$$\{Fwxfr + Fwxrr - (Fwxfl + Fwxrl)\}Tr/2 = Mvt \quad (2)$$

$$(Fwxfl + Fwxfr)Kr = (Fwxrl + Fwxrr)(1 - Kr) \quad (3)$$

Accordingly, the electronic controller 16 for controlling driving force calculates the values satisfying the following equations 1 to 3 as the target braking/driving forces Fwxti (i=fl, fr, rl, rr) of the wheels by, for example, the least square method, on the basis of the vehicle target braking/driving force Fvt after the modification, the vehicle target yaw moment Mvt after the modification and the longitudinal distribution ratio to the rear wheels Kr.

When the target braking/driving force Fwxti of each wheel takes a positive value that means it is a driving force, the electronic controller 16 for controlling driving force sets the target friction braking force Fwbti and the target regenerative braking force Fwrti (i=fl, fr, rl, rr) of each wheel to zero, outputs the signals indicating the target friction braking forces Fwbti to the electronic controller 28 for controlling braking force, sets the target driving force Fwdti (i=fl, fr, rl, rr) of each wheel to the associated target braking/driving force Fwxti, calculates the target driving currents Iti (i=fl, fr, rl, rr) to the electric motor generators 12FL to 12RR by unillustrated maps or functions on the basis of the target driving forces Fwdti, and controls the driving currents applied to the electric motor generators 12FL to 12RR on the basis of the target driving currents Iti, thereby controlling the driving force of each wheel such that the braking/driving force Fwxi of each wheel becomes the associated target braking/driving force Fwxti.

On the other hand, when the target braking/driving forces Fwxti of each wheel takes a negative value which means that the target braking/driving force Fwxti is a braking force and the target braking/driving force Fwxti is not more than the maximum regenerative braking force of each wheel, the electronic controller 16 for controlling driving force sets the target driving force Fwdti and the target friction braking force Fwbti of each wheel to zero, sets the target regenerative braking force Fwrti to the target braking/driving force Fwxti, and controls the electric motor generators 12FL to 12RR such that the regenerative braking force becomes the target regenerative braking force Fwrti.

When the target braking/driving force Fwxti of each wheel takes a negative value which means that the target braking/driving force Fwxti is a braking force and the target braking/driving force Fwxti is greater than the maximum regenerative braking force of each wheel, the electronic controller 16 for controlling driving force sets the target driving force Fwdti of each wheel to zero, sets the target regenerative braking force Fwrti of each wheel to the maximum regenerative braking force Fwxrimax (i=fl, fr, rl, rr), and controls the electric motor generators 12FL to 12RR such that the regenerative braking force becomes the maximum regenerative braking force Fwxrimax. Further, it calculates the braking force that corresponds to the difference between the target braking/driving force Fwxti and the maximum regenerative braking force Fwxrimax as the target friction braking force Fwbti (i=fl, fr, rl, rr), and outputs the signals indicating the target friction braking forces Fwbti of the wheels to the electronic controller 28 for controlling braking force.

The electronic controller 28 for controlling braking force calculates the target braking pressure Pbti (i=fl, fr, rl, rr) of each wheel on the basis of the target friction braking force Fwbti of each wheel inputted from the electronic controller 16 for controlling driving force, and controls the hydraulic circuit 20 such that the braking pressure Pbi of each wheel becomes the associated target braking pressure Pbti, and the friction braking force Fwbi (i=fl, fr, rl, rr) of each wheel thereby becomes the associated target friction braking force Fwbti of each wheel.

Figure 3:
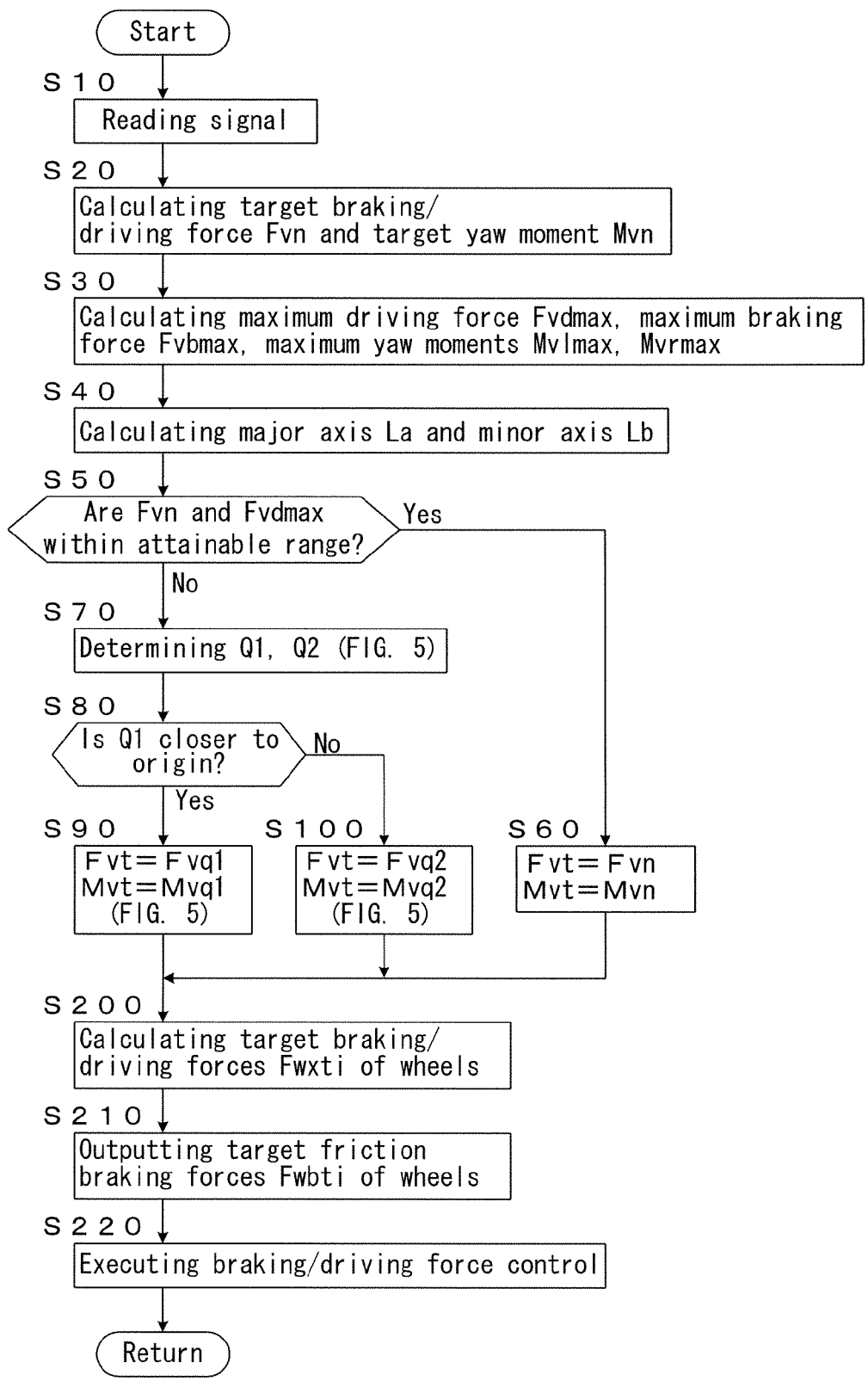
FIG. 3 is a flowchart showing a braking/driving force control routine executed by an electronic controller for controlling driving force in the first embodiment.

The braking/driving force control achieved by the electronic controller 16 for controlling driving force in the first embodiment will now be explained with reference to the flowchart shown in FIG. 3. The control by the flowchart shown in FIG. 3 is started by the activation of the electronic controller 16 for controlling driving force, and it is repeatedly executed every predetermined time until an ignition switch, not shown, is turned off.

At Step 10, the signals indicating the accelerator opening $\phi$ detected by the accelerator opening sensor 14 and the like are firstly read. At Step 20, the vehicle target braking/driving force Fvn and vehicle target yaw moment Mvn that are required to the vehicle and caused by the control of the braking/driving force of each wheel are calculated in the aforesaid manner on the basis of the accelerator opening $\phi$ and the like.

At Step 30, the vehicle maximum driving force Fvdmax, vehicle maximum braking force Fvbmax, vehicle maximum yaw moment Mvlmax in the leftward turning direction, and vehicle maximum yaw moment Mvrmax in the rightward direction, attainable by the braking/driving force of each wheel, are calculated by maps or functions, not shown, on the basis of the road friction coefficient $\mu$. Specifically, the points A to D of the quadrangle 100 shown in FIGS. 4 and 5 are specified.

At Step 40, the major axis La and the minor axis Lb of the ellipse 102 shown in FIGS. 4 and 5 are determined by maps or functions, not shown, on the basis of the road friction coefficient $\mu$, the magnitude of the rate of change of the target yaw moment Mvn, and the magnitude of the rate of change of the target braking/driving force Fvn.

At Step 50, it is determined whether or not the vehicle target braking/driving force Fvn and the vehicle target yaw moment Mvn are within the range of the quadrangular 100 and the ellipse 102, and accordingly whether or not the target braking/driving force Fvn and the target yaw moment Mvn can be achieved through the control of the braking/driving forces of the wheels. When the negative determination is made, the program proceeds to Step 70. When the positive determination is made, the vehicle target braking/driving force Fvt after the modification and the vehicle target yaw moment Mvt after the modification are respectively set to the target braking/driving force Fvn and the target yaw moment Mvn at Step 60, and then, the program proceeds to Step 200.

Figure 5A:
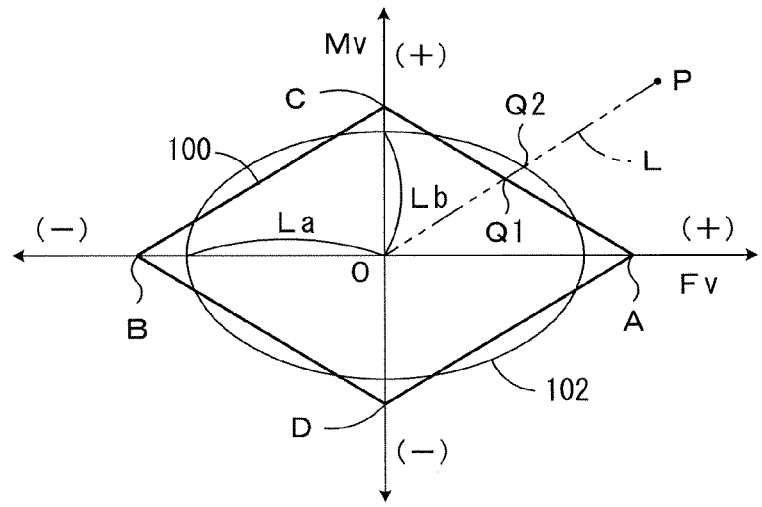
FIG. 5A is an explanatory view showing a manner of a calculation of a vehicle target braking/driving force Fvt after the modification and a vehicle target yaw moment Mvt after the modification in case where a vehicle target braking/driving force Fvn and a vehicle target yaw moment Mvn are outside the range that can be achieved by the control of the braking/driving forces of the wheels in the first embodiment.
Figure 5B:
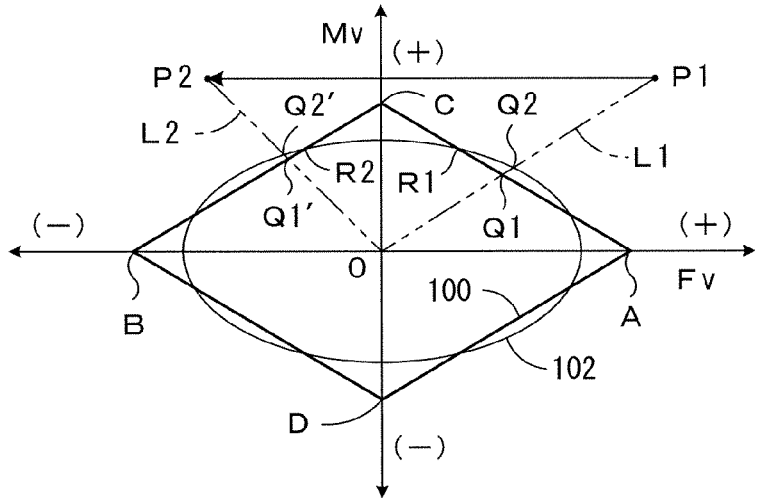
FIG. 5B is an explanatory view showing an operation of the first embodiment when the point indicating the vehicle target braking/driving force Fvn and the vehicle target yaw moment Mvn moves from a point P1 to a point P2 by the change in the vehicle target braking/driving force Fvn.

At Step 70, a point of intersection Q1 of a segment L, which links a point P indicating the vehicle target braking/driving force Fvn and the vehicle target yaw moment Mvn, and the origin O, and the outer line of the quadrangle 100, is obtained as a first target point, and further, a point of intersection Q2 of a segment L, which links the point P indicating the vehicle target braking/driving force Fvn and the vehicle target yaw moment Mvn, and the origin O, and the ellipse 102, is obtained as a second target point, as shown in FIGS. 5A and 5B.

At Step 80, it is determined whether or not the point, closer to the origin O, of the first target point Q1 and the second target point Q2, is the first target point Q1. When a positive determination is made, with the coordinate at the first target point Q1 being (Fvq1, Mvq1), the vehicle target braking/driving force Fvt after the modification and the vehicle target yaw moment Mvt after the modification are set respectively to Fvq1 and Mvq1 at Step 90. Thereafter, the program proceeds to Step 200. When a negative determination is made, with the coordinate at the first target point Q2 being (Fvq2, Mvq2), the vehicle target braking/driving force Fvt after the modification and the vehicle target yaw moment Mvt after the modification are set respectively to Fvq2 and Mvq2 at Step 100. Thereafter, the program proceeds to Step 200.

At Step 200, the target braking/driving force Fwxti (i=fl, fr, rl, rr) of each wheel to achieve the target braking/driving force Fvt and the target yaw moment Mvt is calculated in the above-mentioned manner on the basis of the vehicle target braking/driving force Fvt after the modification and the vehicle target yaw moment Mvt after the modification.

At Step 210, the target friction braking force Fwbti is calculated in the aforesaid manner, and the signals indicating the target friction braking forces Fwbti are outputted to the electronic controller 28 for controlling braking force, whereby the electronic controller 28 for controlling braking force makes a control such that the friction braking force Fwbi of each wheel becomes the associated target friction braking force Fwbti.

At Step 220, each of the electric motor generators 12FL to 12RR is controlled such that the driving force Fwdi or the regenerative braking force Fwri of each wheel respectively becomes the target driving force Fwdti or the target regenerative braking force Fwrti.

According to the illustrated first embodiment, the vehicle target braking/driving force Fvn and the vehicle target yaw moment Mvn, required to the vehicle, through the control of the braking/driving force of each wheel are calculated at Step 20, the vehicle maximum driving force Fvdmax, vehicle maximum braking force Fvbmax, vehicle maximum yaw moment Mvlmax in the leftward turning direction, and the vehicle maximum yaw moment Mvrmax in the rightward turning direction, those of which are attainable by the braking/driving forces of the wheels, are calculated at Step 30, the major axis La and the minor axis Lb of the ellipse 102 are determined at Step 40, and it is determined at Step 50 whether or not the target braking/driving force Fvn and the target yaw moment Mvn can be achieved through the control of the braking/driving forces of the wheels.

When it is determined at Step 50 that the target braking/driving force Fvn and the target yaw moment Mvn cannot be achieved by the control of the braking/driving forces of the wheels, the point of intersection Q1 of the segment L, which links the point P indicating the vehicle target braking/driving force Fvn and the vehicle target yaw moment Mvn, and the origin O, and the outer line of the quadrangle 100, is obtained as a first target point, and further, the point of intersection Q2 of the segment L, which links the point P indicating the vehicle target braking/driving force Fvn and the vehicle target yaw moment Mvn, and the origin O, and the ellipse 102, is obtained as a second target point at Step 70. At Steps 80 to 100, the vehicle target braking/driving force Fvt after the modification and the vehicle target yaw moment Mvt after the modification are set to the value at the coordinate of the target point, which is closer to the origin O, of the first target point Q1 and the second target point Q2.

Consequently, according to the illustrated first embodiment, when the vehicle is under the condition where the target braking/driving force Fvn and the target yaw moment Mvn cannot be achieved by the control of the braking/driving force of each wheel, the vehicle target braking/driving force Fvt after the modification and the vehicle target yaw moment Mvt after the modification are calculated such that, within the range where the ratio of the vehicle target braking/driving force Fvt and the yaw moment Mvt after the modification through the control of the braking/driving forces of the wheels coincides with the ratio of the target braking/driving force Fvn and the target yaw moment Mvn through the control of the braking/driving forces of the wheels required to the vehicle, the vehicle braking/driving force Fv and the yaw moment Mv by the target braking/driving forces Fwxti of the wheels take values as greater as possible. Therefore, the braking/driving forces of the wheels are controlled such that the ratio of the vehicle braking/driving force and the yaw moment surely coincides with the ratio of the target braking/driving force and the target yaw moment, with the result that the braking/driving force and the yaw moment required to the vehicle can be achieved as much as possible within the range of the braking/driving forces that can be generated by the wheels.

Since the vehicle target braking/driving force Fvt after the modification and the vehicle target yaw moment Mvt after the modification are set to the values at the coordinate of the target point, which is closer to the origin O, of the first target point Q1 and the second target point Q2, it is prevented that the vehicle target yaw moment Mvt after the modification and/or the vehicle target braking/driving force Fvt after the modification sharply change to increase or decrease even if the target braking/driving force Fvn and/or the target yaw moment Mvn sharply change due to a sharp acceleration or deceleration operation or a sharp steering operation by a driver. Therefore, a fear of the vehicle running stability deteriorating or an occupant or occupants of the vehicle feeling a sense of incongruity, which is caused by the sharp change in increase or decrease of the vehicle yaw moment and/or the braking/driving force, can effectively be reduced.

The case where the target braking/driving force Fvn sharply changes with a constant rate of change due to the sharp acceleration or deceleration operation by a driver, and the point indicating the target braking/driving force Fvn and the vehicle target yaw moment Mvn moves from the point P1 to the point P2 as shown in FIG. 5B is considered, for example. When the change in the vehicle target braking/driving force Fvt after the modification and the vehicle target yaw moment Mvt after the modification are not limited by the ellipse 102, the point indicating the vehicle target braking/driving force Fvt after the modification and the vehicle target yaw moment Mvt after the modification moves like Q1→C→Q1' along the outer line of the quadrangle 100. With this movement, the vehicle yaw moment sharply increases or decreases.

On the other hand, according to the illustrated first embodiment, the minor axis Lb of the ellipse 102 is made smaller than a standard value, and the vehicle target yaw moment Mvt after the modification is limited so as not to exceed the quadrangle 100 and the ellipse 102. Therefore, even when the target braking/driving force Fvn sharply changes due to the sharp acceleration or deceleration operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2→Q1', whereby the sharp increase or decrease of the vehicle yaw moment can surely be prevented.

Figure 5C:
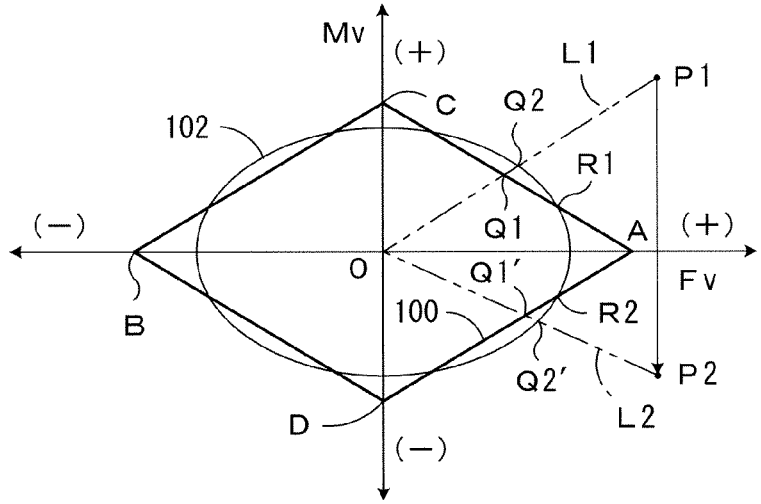
FIG. 5C is an explanatory view showing an operation of the first embodiment when the point indicating the vehicle target braking/driving force Fvn and the vehicle target yaw moment Mvn moves from a point P1 to a point P2 by the change in the vehicle target yaw moment Mvn.

Similarly, the case where the target yaw moment Mvn sharply changes due to the sharp steering operation by a driver, and the point indicating the target braking/driving force Fvn and the vehicle target yaw moment Mvn moves from the point P1 to the point P2 as shown in FIG. 5C is considered, for example. When the change in the vehicle target braking/driving force Fvt after the modification and the vehicle target yaw moment Mvt after the modification is not limited by the ellipse 102, the point indicating the vehicle target braking/driving force Fvt after the modification and the vehicle target yaw moment Mvt after the modification moves like Q1→A→Q1' along the outer line of the quadrangle 100. With this movement, the vehicle braking/driving force sharply increases or decreases.

On the other hand, according to the illustrated first embodiment, the major axis La of the ellipse 102 is made smaller than a standard value, and the vehicle target braking/driving force Fvt after the modification is limited so as not to exceed the quadrangle 100 and the ellipse 102. Therefore, even when the target yaw moment Mvn sharply changes due to the sharp steering operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2→Q1', whereby the sharp increase or decrease of the vehicle braking/driving force can surely be prevented.

In the illustrated first embodiment, in particular, the driving sources for the wheels are electric motor generators 12FL to 12RR provided on each wheel. In case where the target braking/driving forces Fwxti of the wheels take negative values, which means the target braking/driving forces Fwxti are braking forces, the regenerative braking forces by the electric motor generators 12FL to 12RR are used. Accordingly, the vehicle motion energy can effectively be returned as electric energy upon the braking operation for deceleration, while achieving the braking/driving force and the yaw moment required to the vehicle as much as possible within the range of the braking/driving forces that can be generated by the wheels.

While, in the illustrated first embodiment, the electric motor generators 12FL to 12RR are in-wheel motors, the electric motor generators may be provided at the vehicle body. Further, the electric motor generators as driving sources for wheels may not perform regenerative braking. The driving source may be other than the electric motor generator so long as it can increase or decrease the driving force of each wheel independently.

Although the electric motor generators 12FL to 12RR are provided so as to correspond to four wheels in the illustrated first embodiment, this embodiment may be applied to a vehicle having driving sources provided only at the left and right front wheels or left and right rear wheels. In this case, the quadrangle 100 takes a form shown by 100' in FIG. 4B, and when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. Accordingly, in the case of the latter vehicle, the ellipse is such that the midpoint O' of the segment linking the point A' and B of the maximum braking/driving force becomes the center of the ellipse as indicated as 102' in FIG. 4B. The above-mentioned effects can also be achieved with this vehicle.

Second Embodiment

Figure 6:
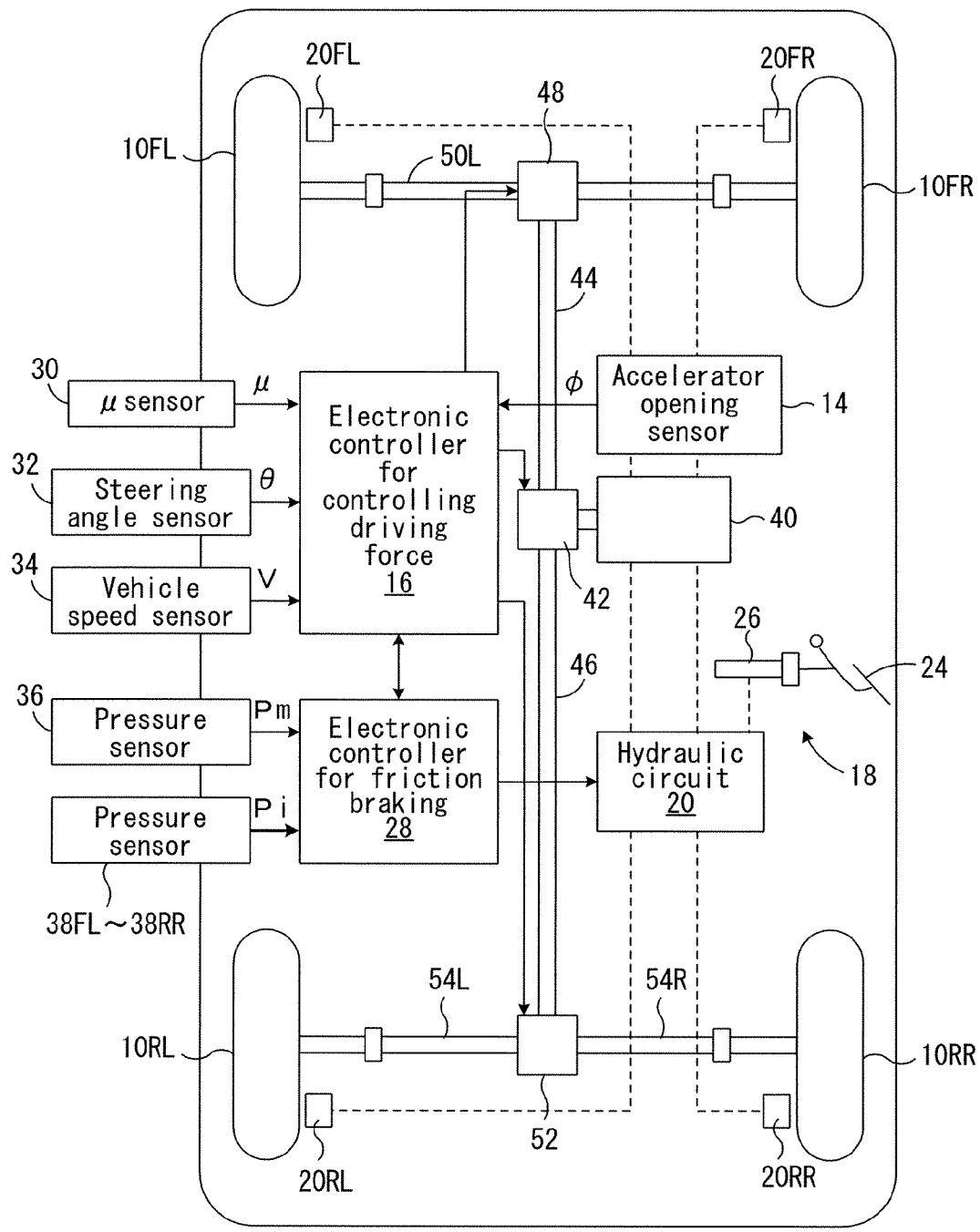
FIG. 6 is a schematic block diagram showing a vehicle braking/driving force control apparatus applied to a four-wheel-drive vehicle in which driving force and regenerative braking force from a single electric motor generator, which is common to four wheels, are controlled so as to be distributed to the four wheels according to a second embodiment of the present invention.

FIG. 6 is a schematic block diagram showing a braking/driving force control apparatus applied to a four-wheel-drive vehicle in which driving force and regenerative braking force from a single electric motor generator, which is common to four wheels, are controlled so as to be distributed to front and rear wheels and right and left wheels according to a second embodiment of the present invention. The components in FIG. 6 same as those in FIG. 1 are identified by the same numerals in FIG. 1.

In this second embodiment, an electric motor generator 40 is provided that serves as a driving source common to the front left wheel 10FL, front right wheel 10FR, rear left wheel 10RL, and rear right wheel 10RR. The driving force or the regenerative braking force from the electric motor generator 40 is transmitted to a front-wheel propeller shaft 44 and rear-wheel propeller shaft 46 through a center differential 42 that can control the distribution ratio to the front wheels and rear wheels.

The driving force or the regenerative braking force of the front-wheel propeller shaft 44 is transmitted to the front-left wheel axle 50L and front-right wheel axle 50R by a front-wheel differential 48 that can control the distribution ratio to the front-left wheel and front-right wheel, whereby the front-left wheel 10FL and front-right wheel 10FR are rotatably driven. Similarly, the driving force or the regenerative braking force of the rear-wheel propeller shaft 46 is transmitted to the rear-left wheel axle 54L and rear-right wheel axle 54R by a rear-wheel differential 52 that can control the distribution ratio of the rear-left wheel and rear-right wheel, whereby the rear-left wheel 10RL and rear-right wheel 10RR are rotatably driven.

The driving force of the electric motor generator 40 is controlled by the electronic controller 16 for controlling driving force on the basis of the accelerator opening φ detected by the accelerator opening sensor 14. The regenerative braking force of the electric motor generator 40 is also controlled by the electronic controller 16 for controlling driving force. The electronic controller 16 for controlling driving force controls the distribution ratio of the driving force and regenerative braking force to the front wheels and rear wheels by the center differential 42, controls the distribution ratio of the driving force and regenerative braking force to the left wheels and right wheels by the front-wheel differential 48, and controls the distribution ratio of the driving force and regenerative braking force to the left wheels and right wheels by the rear-wheel differential 52.

In this second embodiment too, the electronic controller 16 for controlling driving force calculates, in the same manner as in the first embodiment, the target braking/driving force Fvn, required to the vehicle, through the control of the braking/driving force of each wheel, the vehicle target yaw moment Mvn, required to the vehicle, through the control of the braking/driving force of each wheel, the vehicle maximum driving force Fvdmax, the vehicle maximum braking force Fvbmax, the vehicle maximum yaw moment Mvlmax in the leftward turning direction, and the vehicle maximum yaw moment Mvrmax in the rightward turning direction by the braking/driving force of each wheel.

In the illustrated second embodiment, it is assumed that the driving forces Fwdi of the wheels when the maximum driving force of the electric motor generator 40 is uniformly distributed to the front-left wheel 10FL, front-right wheel 10FR, rear-left wheel 10RL and rear-right wheel 10RR is smaller than the producible maximum longitudinal force that is determined by the friction coefficient μ of the normal road surface.

As shown in FIG. 7A, the vehicle maximum driving force Fvdmax under the condition where the yaw moment by the braking/driving forces of the wheels is not acted on the vehicle is achieved when the braking/driving forces Fwxfl and Fwxfr of the front-left wheel 10FL and front-right wheel 10FR are the maximum driving forces Fwdflmax and Fwdfrmax in case where the distribution of the driving force to the right and left wheels is equal, and the braking/driving forces Fwxrl and Fwxrr of the rear-left wheel 10RL and rear-right wheel 10RR are the maximum driving forces Fwdrlmax and Fwdrrmax in case where the distribution of the driving force to the right and left wheels is equal.

Similarly, as shown in FIG. 7B, the vehicle maximum braking force Fvbmax under the condition where the yaw moment by the braking/driving force of the wheels is not acted on the vehicle is achieved when the braking/driving forces Fwxfl and Fwxfr of the front-left wheel 10FL and front-right wheel 10FR are the maximum braking forces Fwbflmax and Fwbfrmax in case where the distribution of the braking force to the right and left wheels is equal, and the braking/driving forces Fwxrl and Fwxrr of the rear-left wheel 10RL and rear-right wheel 10RR are the maximum braking forces Fwbrlmax and Fwbrrmax in case where the distribution of the braking force to the right and left wheels is equal.

As shown in FIG. 7C, the vehicle maximum yaw moment Mvlmax in the leftward turning direction under the condition where the longitudinal force by the braking/driving forces of the wheels is not acted on the vehicle is achieved in case where the driving force is distributed to the right wheels, the braking/driving forces Fwxfr and Fwxrr of the front-right wheel 10FR and rear-right wheel 10RR are the maximum driving forces Fwdfrmax' and Fwdrrmax', and their magnitudes are equal to the magnitudes of the maximum braking forces Fwbflmax and Fwbrlmax of the front-left wheel 10FL and rear-left wheel 10RL respectively.

As shown in FIG. 7D, the vehicle maximum yaw moment Mvlmax' in the leftward turning direction under the condition where the vehicle braking/driving force is the maximum driving force Fvdmax is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum driving forces Fwdflmax' and Fwdrrmax'.

Figure 8E:
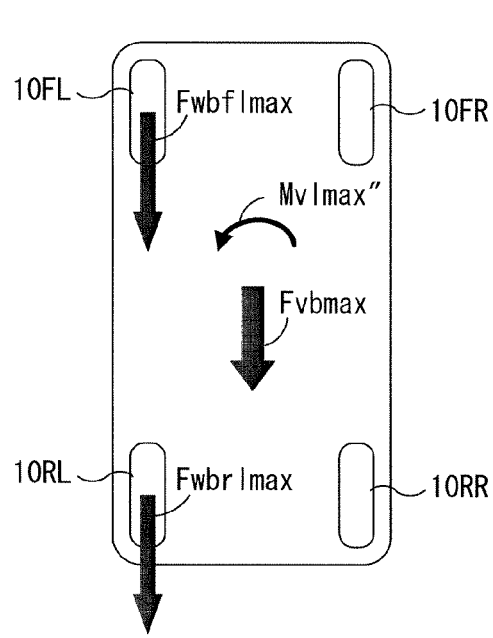
FIG. 8 is an explanatory view for explaining other various cases of the relationship between a braking/driving force of each wheel and a vehicle braking/driving force and the relationship between a braking/driving force of each wheel and a vehicle yaw moment in the second embodiment.

As shown in FIG. 8E, the vehicle maximum yaw moment Mvlmax" in the leftward turning direction under the condition where the driving force is not acted on any wheels is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum braking forces Fwbflmax and Fwbrlmax.

Figure 8F:
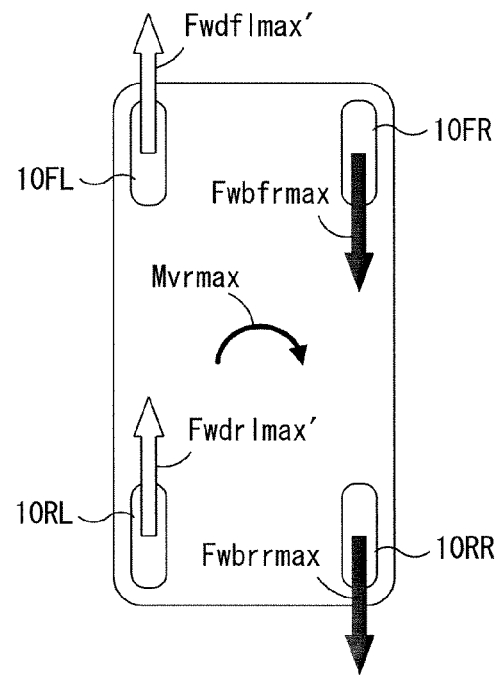

As shown in FIG. 8F, the vehicle maximum yaw moment Mvrmax in the rightward turning direction under the condition where the longitudinal force by the braking/driving forces of the wheels is not acted on the vehicle is achieved in case where the driving force is distributed to the left wheels, the braking/driving forces Fwxfl and Fwxrl of the front-left wheel 10FL and rear-left wheel 10RL are the maximum driving forces Fwdflmax' and Fwdrlmax', and their magnitudes are equal to the magnitudes of the maximum braking forces Fwbfrmax and Fwbrrmax of the front-right wheel 10FR and rear-right wheel 10RR respectively.

Figure 8G:
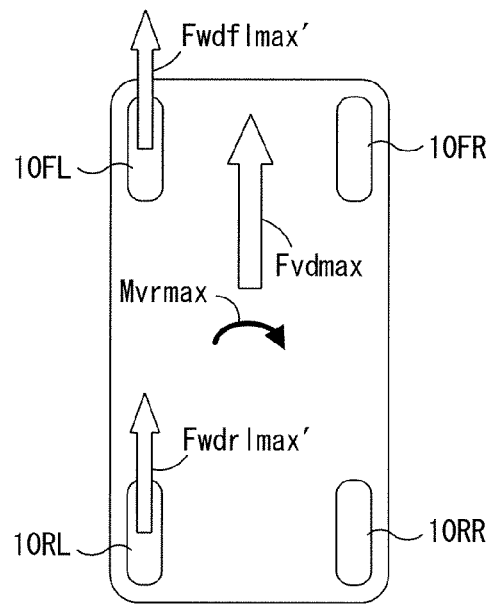

As shown in FIG. 8G, the vehicle maximum yaw moment Mvrmax' in the rightward turning direction under the condition where the vehicle braking/driving force is the maximum driving force Fvdmax is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum driving forces Fwdflmax' and Fwdrlmax'.

Figure 8H:
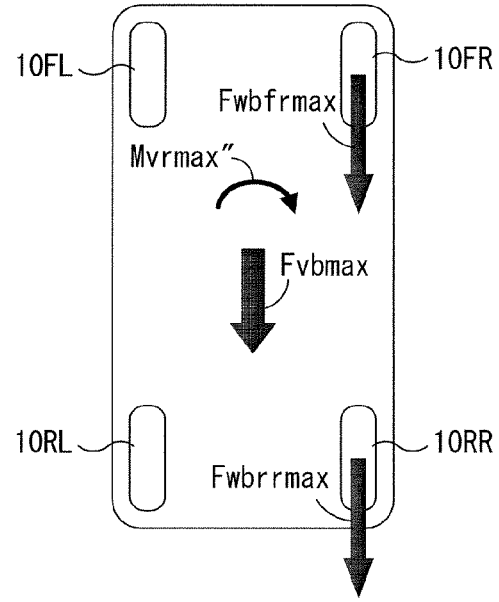

As shown in FIG. 8H, the vehicle maximum yaw moment Mvrmax" in the rightward turning direction under the condition where the driving force is not acted on any wheels is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum braking forces Fwbfrmax and Fwbrrmax.

The maximum driving forces Fwdimax of the wheels are determined by the maximum output torque of the electric motor generator 40, the road friction coefficient μ, and each distribution ratio, and the maximum braking forces Fwbimax of the wheels are determined by the road friction coefficient μ. Therefore, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the maximum output torque of the electric motor generator 40 and the road friction coefficient μ. Accordingly, if the maximum output torque of the electric motor generator 40 and the road friction coefficient μ are found, the vehicle maximum driving forces Fvdmax and the other values can be estimated.

Figure 9A:
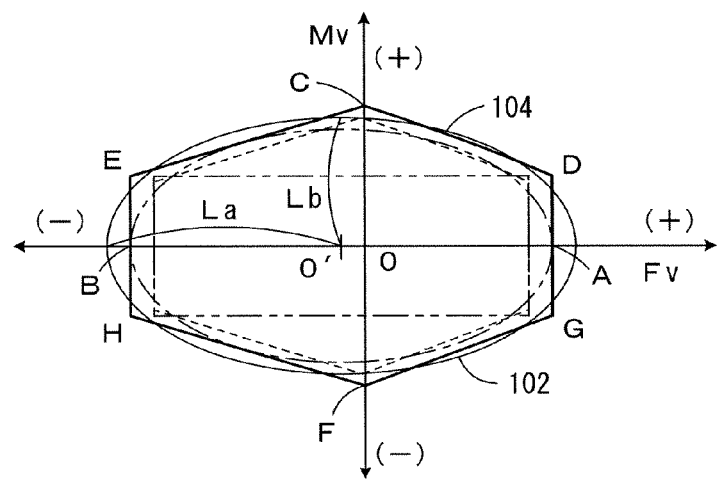
FIG. 9A is a graph showing the range, that can be achieved by the braking/driving forces of the wheels, of the vehicle braking/driving force and vehicle yaw moment in the second embodiment.

As shown in FIG. 9A, in a rectangular coordinate with the vehicle braking/driving force Fvx as abscissa and the vehicle yaw moment Mv as ordinate, the vehicle braking/driving force Fvx and the vehicle yaw moment Mv that are attainable by the control of the braking/driving force of each wheel take values within a hexagon 104 decided by the vehicle maximum driving force Fvdmax, vehicle maximum braking force Fvbmax, vehicle maximum yaw moment Mvlmax in the leftward turning direction, vehicle maximum yaw moment Mvrmax in the rightward turning direction, and the range in which the vehicle yaw moment Mv can be varied when the vehicle braking/driving force Fvx is the maximum driving force Fvdmax or the maximum braking force Fvbmax.

Figure 9B:
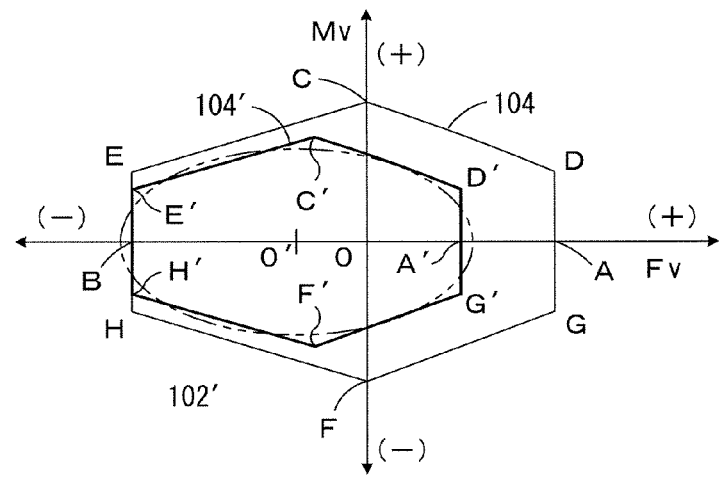
FIG. 9B is a graph showing the range, that can be achieved by the braking/driving forces of the wheels, of the vehicle braking/driving force and the vehicle yaw moment in a vehicle in which only front wheels or only rear wheels are driven in the second embodiment.

Notably, in FIG. 9, points A to H correspond to the cases A to H in FIGS. 7 and 8. As shown by a broken line in FIG. 9A, the hexagon 104 becomes small as the road friction coefficient μ decreases. Further, as the magnitude of the steering angle θ increases, the lateral force of front left and front right wheels, that are steerable wheels, increases, so that the allowance of the longitudinal force becomes small. Therefore, the hexagon 104 becomes small as magnitude of the steering angle θ increases.

When the output torque of the electric motor generator 40 is sufficiently great, the maximum driving force and maximum braking force of each wheel are determined by the road friction coefficient μ. Therefore, supposing that the vehicle accelerating direction and the vehicle leftward turning direction are defined as positive, the relationships between the maximum driving force and maximum braking force of each wheel, the vehicle maximum driving force and vehicle maximum braking force, and vehicle maximum yaw moment in the leftward turning direction and vehicle maximum yaw moment in the rightward turning direction are equal to those in the above-mentioned first embodiment. Accordingly, the range of the vehicle driving force and yaw moment that can be achieved by the braking/driving forces of the wheels becomes the range of the diamond like the first embodiment.

Further, when the output torque of the electric motor generator 40 and the maximum braking force of each wheel are smaller than those in the embodiment, the vehicle driving force becomes the maximum even if all the maximum driving force is distributed to the left wheels or right wheels, and the vehicle braking force becomes the maximum even if all the braking forces is distributed to the left wheels or right wheels. Therefore, as indicated by the phantom line in FIG. 9A, the range of the vehicle driving force and yaw moment that can be achieved by the braking/driving forces of the wheels becomes the range of the rectangle.

The coordinates at the points A to H shown in FIG. 9 are (Fvdmax, 0), (Fvbmax, 0), (0, Mvlmax), (Fvdmax, KmMvlmax), (Fvbmax, KmMvlmax), (0, Mvrmax), (Fvdmax, −KmMvlmax), and (Fvbmax, −KmMvlmax), respectively, supposing that the coefficient Km is defined as not less than 0 and not more than 1.

Although the driving source is the electric motor generator 40 that is common to four wheels in the illustrated second embodiment, the driving source for driving the wheels so as to execute the control of the driving force distribution between right and left wheels may be optional driving means known by a person skilled in the art, such as an internal combustion engine, hybrid system, or the like.

Although a single electric motor generator 40 is provided as a common driving source to four wheels in the illustrated second embodiment, a driving source common to the front-right wheel and front-left wheel and a driving source common to the rear-right wheel and rear-left wheel may be provided. Further, a driving source common to only the front-right wheel and front-left wheel or a driving source common to only the rear-right wheel and rear-left wheel may be provided. In this case, the hexagon 104 takes a shape 104' shown in FIG. 9B. Specifically, when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved by this vehicle.

In the illustrated second embodiment too, the electronic controller 16 for controlling driving force sets the ellipse 102 whose major axis La and the minor axis Lb align with the abscissa and ordinate of the rectangular coordinate respectively and that crosses each side of the hexagon 104 as shown in FIG. 9A. When the magnitude of the vehicle maximum braking force Fvbmax is greater than the magnitude of the vehicle maximum driving force Fvdmax, the center O' of the ellipse 102 is set at the midpoint of the segment linking the point A and the point B, for example, which point is on the braking side with respect to the origin O of the rectangular coordinate.

In this second embodiment too, the major axis La and the minor axis Lb are variably set in accordance with the road friction coefficient, i.e., the major axis La and the minor axis Lb are set to take smaller values when the road friction coefficient is small, compared to the case in which the road friction coefficient is great. The major axis La is variably set in accordance with the magnitude of the rate of change of the target yaw moment Mvn in such a manner that, as the magnitude of the rate of change of the target yaw moment Mvn is great, the major axis La is set to be smaller. The minor axis Lb is variably set in accordance with the magnitude of the rate of change of the vehicle target braking/driving force Fvn in such a manner that, as the magnitude of the rate of change of the vehicle target braking/driving force Fvn is great, the minor axis Lb is set to be smaller.

It is preferable that the length (2La) of the major axis of the ellipse 102 is longer than the length of the segment linking the point A and the point B of the hexagon 104, and the length (2Lb) of the minor axis of the ellipse 102 is shorter than the length of the segment linking the point C and the point F of the hexagon 104. Like the aforesaid first embodiment, the dimensional relationship between the segment linking the point A and the point B of the hexagon 104 and the segment linking the point C and the point F of the hexagon 104 and which axis of the ellipse, i.e. the major axis La or the minor axis Lb is along the abscissa or the ordinate depend upon the calibrating manner of the abscissa and ordinate. Therefore, the shape of the hexagon 104 and the shape of the ellipse 102 depend upon the calibrating manner of the abscissa and ordinate.

When the vehicle target braking/driving force Fvn and the vehicle target yaw moment Mvn take values within the hexagon 104 and values within the ellipse 102, the electronic controller 16 for controlling driving force sets the vehicle target braking/driving force Fvt after the modification and the vehicle target yaw moment Mvt after the modification to the target braking/driving force Fvn and the target yaw moment Mvn, respectively.

On the other hand, when the vehicle target braking/driving force Fvn and the vehicle target yaw moment Mvn take values outside the hexagon 104 or outside the ellipse 102, the electronic controller 16 for controlling driving force calculates the target braking/driving force Fvt after the modification and the target yaw moment Mvt after the modification in such a manner that the ratio of the vehicle target braking/driving force Fvt after the modification and the vehicle target yaw moment Mvt after the modification becomes the ratio of the target braking/driving force Fvn and the target yaw moment Mvn, and the target braking/driving force Fvt and the target yaw moment Mvt after the modification take the values greatest in magnitude within the hexagon 104 and within the ellipse 102.

Supposing that the longitudinal distribution ratio of the vehicle braking/driving force Fwxi to the rear wheels is defined as Kr (constant of 0<Kr<1), the lateral distribution ratio of the braking/driving force Fwxi to the right wheels is defined as Ky (0<Kr<1) for the front wheels and rear wheels, and the vehicle tread is defined as Tr, the following equations 4 to 7 are established. Accordingly, the electronic controller 16 for controlling driving force calculates the values satisfying the following equations 4 to 7 as the target braking/driving force Fwxti (i=fl, fr, rl, rr) and the lateral distribution ratio Ky to the right wheels by, for example, the least square method, on the basis of the vehicle target braking/driving force Fvt and the vehicle target yaw moment Mvt after the modification.

$$Fwxfl + Fwxfr + Fwxrl + Fwxrr = Fvt \quad (4)$$

$$\{Fwxfr + Fwxrr - (Fwxfl + Fwxrl)\}Tr/2 = Mvt \quad (5)$$

$$(Fwxfl + Fwxfr)Kr = (Fwxrl + Fwxrr)(1-Kr) \quad (6)$$

$$(Fwxfl + Fwxrl)Ky = (Fwxfr + Fwxrr)(1-Ky) \quad (7)$$

When the vehicle braking/driving force Fv takes a positive value which means the vehicle braking/driving force Fv is a driving force, and the target braking/driving forces Fwxti of the wheels are positive values that means the braking/driving forces Fwxti are driving forces, the electronic controller 16 for controlling driving force sets the target friction braking forces Fwbti and the target regenerative braking forces Fwrti (i=fi, fr, rl, rr) of the wheels to zero, outputs the signals indicating the target friction braking forces Fwbti to the electronic controller 28 for controlling braking force, and sets the target driving forces Fwdti (i=fl, fr, rl, rr) of the wheels to the target braking/driving forces Fwxti.

Then, the electronic controller 16 for controlling driving force calculates the target driving current It to the electric motor generator 40 and the lateral distribution ratio Ky to the right wheels by unillustrated maps or functions on the basis of the target driving forces Fwdti, and controls the driving current applied to the electric motor generator 40 on the basis of the target driving current It as well as controls the front-wheel differential 48 and the rear-wheel differential 52 on the basis of the lateral distribution ratio Ky to the right wheels, thereby controlling the driving force of each wheel such that the braking/driving forces Fwxi of the wheels becomes the target braking/driving force Fwxti.

On the other hand, when the vehicle braking/driving force Fv takes a positive value that means the vehicle braking/driving force Fv is a driving force, but the target braking/driving force Fwxti of any one of wheels takes a negative value that means it is a braking force, and when the vehicle braking/driving force Fv takes a negative value that means it is a braking force, but the target braking/driving force Fwxti of any one of wheels takes a positive value that means it is a driving force, the electronic controller 16 for controlling driving force determines the lateral distribution ratio Ky to the right wheels such that the driving force is distributed only to the side where the target braking/driving forces Fwxti take positive values, calculates the target driving current It to the electric motor generator 40 on the basis of the sum of the positive target braking/driving forces Fwxti, and outputs signals indicating the target braking/driving forces Fwxti to the electronic controller 28 for controlling braking force such that the friction braking force by the friction braking device 18 is applied to the wheel having the negative target braking/driving force Fwxti.

Then, the electronic controller 16 for controlling driving force controls the driving current applied to the electric motor generator 40 on the basis of the target driving current It, and controls the front-wheel differential 48 and the rear-wheel differential 52 on the basis of the lateral distribution ratio Ky to the right wheels. The electronic controller 28 for controlling braking force applies the friction braking force according to the target braking/driving force Fwxti to the wheel having the negative target braking/driving force Fwxti. Accordingly, the braking/driving forces Fwxi of the wheels are controlled to coincide with the target braking/driving forces Fwxti.

When the sum of the target braking/driving forces Fwxti is not more than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti and the target friction braking forces Fwbti of the wheels to 0, and sets the target regenerative braking force Frt to the sum of the target braking/driving forces Fwxti, thereby controlling the lateral distribution ratio Ky to the right wheels and the electric motor generator 40 such that the regenerative braking force becomes the target regenerative braking force Frt.

When the magnitude of the target braking/driving force Fwxti of any one of wheels is greater than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti of the wheels to 0, sets the regenerative braking force by the electric motor generator 40 to the maximum regenerative braking force, and sets the lateral distribution ratio Ky to the right wheels such that the distribution ratio of the regenerative braking force to the wheel having the greater target braking/driving force Fwxti increases.

Then, the electronic controller 16 for controlling driving force calculates, as the target friction braking forces Fwbti, the values obtained by the subtraction from the target braking/driving forces Fwxti of the wheels the associated regenerative braking forces of the wheels, and outputs the signals indicating the target friction braking forces Fwbti to the electronic controller 28 for controlling braking force. Further, the electronic controller 16 for controlling driving force controls the electric motor generator 40 such that the regenerative braking force becomes the maximum regenerative braking force, and controls the front-wheel differential 48 and the rear-wheel differential 52 on the basis of the lateral distribution ratio Ky to the right wheels.

In this second embodiment too, the electronic controller 28 for controlling braking force calculates the target braking pressures Pbti (i=fl, fr, rl, rr) of the wheels on the basis of the target friction braking forces Fwbti of the wheels inputted from the electronic controller 16 for controlling driving force, and controls the hydraulic circuit 20 such that the braking pressures Pbi of the wheels becomes the associated target braking pressures Pbti, thereby controlling such that the friction braking forces Fwbi (i=fl, fr, rl, rr) of the wheels become the associated target friction braking forces Fwbti of the wheels.

The control of the braking/driving forces of the wheels in the second embodiment is substantially the same as that in the first embodiment except that the hexagon 104 is set instead of the quadrangle 100, and the regenerative braking forces and the target friction braking forces Fwbti of the wheels are calculated in the manner described above. Therefore, the illustration of the flowchart and the explanation with reference to the flowchart are omitted.

According to the illustrated second embodiment, like the above-mentioned first embodiment, when the vehicle is under the condition where the target braking/driving force Fvn and the target yaw moment Mvn cannot be achieved by the control of the braking/driving forces of the wheels, the braking/driving forces of the wheels are controlled such that the ratio of the vehicle braking/driving force and the yaw moment surely coincides with the ratio of the target braking/driving force and the target yaw moment, with the result that the braking/driving force and the yaw moment required to the vehicle can be achieved as much as possible within the range of the braking/driving forces that can be generated by the wheels.

Since the vehicle target braking/driving force Fvt after the modification and the vehicle target yaw moment Mvt after the modification are set to the values at the coordinate of the target point, which is closer to the origin O, of the first target point Q1 and the second target point Q2, it is prevented that the vehicle target yaw moment Mvt after the modification or the vehicle target braking/driving force Fvt after the modification sharply changes to increase or decrease even if the target braking/driving force Fvn or the target yaw moment Mvn sharply changes due to a sharp acceleration or deceleration operation or a sharp steering operation by a driver. Therefore, a fear of the vehicle running stability deteriorating or an occupant or occupants of the vehicle feeling a sense of incongruity, which is caused by the sharp change in increase or decrease of the vehicle yaw moment and/or the braking/driving force, can effectively be reduced.

Figure 10A:
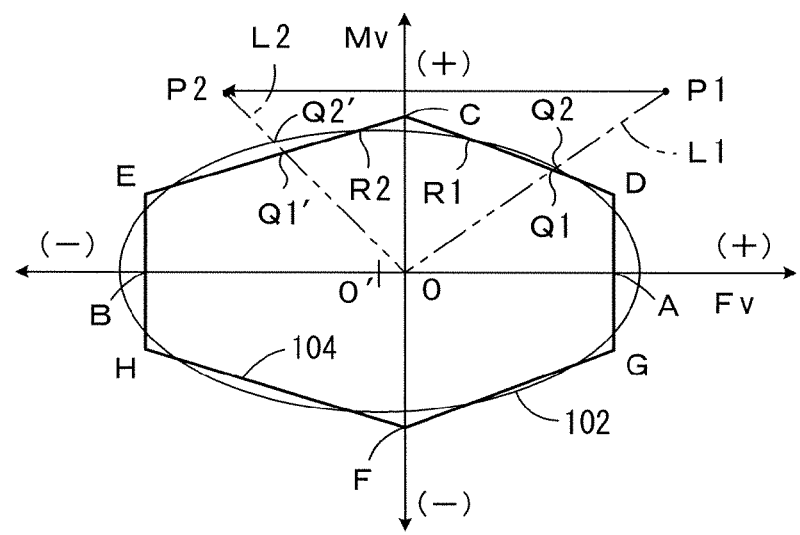
FIG. 10A is an explanatory view showing an operation of the second embodiment when the point indicating the vehicle target braking/driving force Fvn and the vehicle target yaw moment Mvn moves from a point P1 to a point P2 by the change in the vehicle target braking/driving force Fvn.

The case where the target braking/driving force Fvn sharply changes with a constant rate of change due to the sharp acceleration or deceleration operation by a driver, and the point indicating the target braking/driving force Fvn and the vehicle target yaw moment Mvn moves from the point P1 to the point P2 as shown in FIG. 10A is considered, for example. When the changes in the vehicle target braking/driving force Fvt after the modification and the vehicle target yaw moment Mvt after the modification are not limited by the ellipse 102, the point indicating the vehicle target braking/driving force Fvt a after the modification nd the vehicle target yaw moment Mvt after the modification moves like Q1→C→Q1' along the outer line of the hexagon 104. With this movement, the vehicle yaw moment sharply increases or decreases.

On the other hand, according to the illustrated second embodiment, the minor axis Lb of the ellipse 102 is made smaller than a standard value, and the vehicle target yaw moment Mvt after the modification is limited so as not to exceed the hexagon 104 and the ellipse 102. Therefore, even when the target braking/driving force Fvn sharply changes due to the sharp acceleration or deceleration operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2→Q1', whereby the sharp increase or decrease of the vehicle yaw moment can surely be prevented.

Figure 10B:
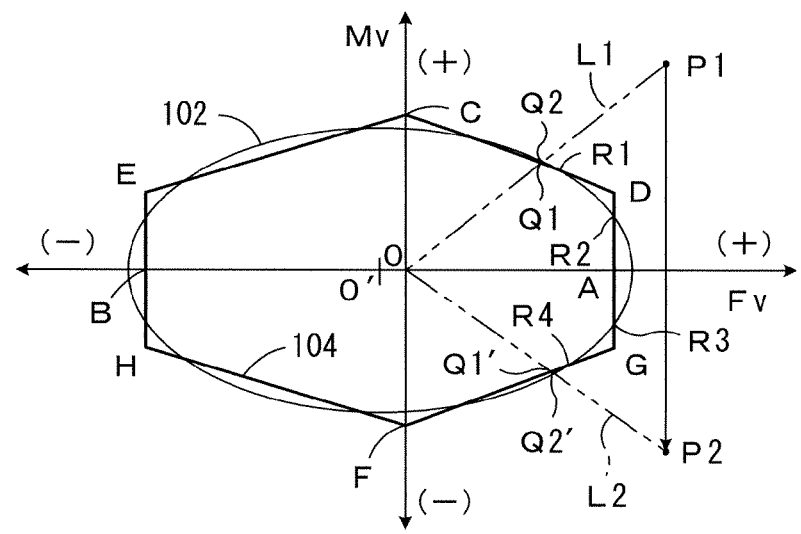
FIG. 10B is an explanatory view showing an operation of the second embodiment when the point indicating the vehicle target braking/driving force Fvn and the vehicle target yaw moment Mvn moves from a point P1 to a point P2 by the change in the vehicle target yaw moment Mvn.

Similarly, the case where the target yaw moment Mvn sharply changes due to the sharp steering operation by a driver, and the point indicating the target braking/driving force Fvn and the vehicle target yaw moment Mvn moves from the point P1 to the point P2 as shown in FIG. 10B is considered, for example. When the changes in the vehicle target braking/driving force Fvt after the modification and the vehicle target yaw moment Mvt after the modification are not limited by the ellipse 102, the point indicating the vehicle target braking/driving force Fvt after the modification and the vehicle target yaw moment Mvt after the modification moves like Q1→D→A→G→Q1' along the outer line of the hexagon 104. With this movement, the vehicle braking/driving force sharply increases or decreases.

On the other hand, according to the illustrated second embodiment, the major axis La of the ellipse 102 is made smaller than a standard value, and the vehicle target braking/driving force Fvt after the modification is limited so as not to exceed the hexagon 104 and the ellipse 102. Therefore, even when the target yaw moment Mvn sharply changes due to the sharp steering operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2→A→R3→R4→Q1', whereby the sharp increase or decrease of the vehicle braking/driving force can surely be prevented.

According to the illustrated second embodiment, in particular, the electric motor generator 40 that is common to all the wheels and serves as a driving source generates a regenerative braking force, in case where the vehicle target braking/driving force Fvt takes a negative value that means it is a braking force. Therefore, like the above-mentioned first embodiment, the vehicle motion energy can effectively be returned as electric energy upon the braking operation for deceleration, while achieving the braking/driving force and the yaw moment required to the vehicle as much as possible within the range of the braking/driving force that can be generated by each wheel.

Although the driving source is the electric motor generator 40 that is common to four wheels in the illustrated second embodiment, the driving source for driving the wheels so as to execute the control of the driving force distribution between left and right wheels may be optional driving means known by a person skilled in the art, such as an internal combustion engine, hybrid system, or the like.

Although a single electric motor generator 40 is provided as a common driving source to four wheels in the illustrated second embodiment, a driving source common to the front-left wheel and front-right wheel and a driving source common to the rear-left wheel and rear-right wheel may be provided. Further, a driving source common to only the front-left wheel and front-right wheel or a driving source common to only the rear-left wheel and rear-right wheel may be provided. In this case, the hexagon 104 takes a shape 104' shown in FIG. 9C. Specifically, when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved by this vehicle.

According to the illustrated first and second embodiments, the major axis La and the minor axis Lb are variably set in accordance with the road friction coefficient in such a manner that, when the road friction coefficient is small, the major axis La and the minor axis Lb take smaller values compared to the case in which the road friction coefficient is great. Therefore, the vehicle target braking/driving force Fvt and the vehicle target yaw moment Mvt are appropriately modified by the ellipse 102 which is variably set in accordance with the changes of the vehicle maximum driving force Fvdmax, vehicle maximum braking force Fvbmax, vehicle maximum yaw moment Mvlmax in the leftward turning direction and vehicle maximum yaw moment Mvrmax in the rightward turning direction, those of which are caused by the change of the road friction coefficient, with the result that the sharp change in the vehicle yaw moment and braking/driving force can appropriately be prevented regardless of the road friction coefficient, compared to the case in which the major axis La and the minor axis Lb are constant regardless of the road friction coefficient.

According to the illustrated first and second embodiments, the major axis La is variably set in accordance with the magnitude of the rate of change of the target yaw moment Mvn in such a manner that, as the magnitude of the rate of change of the target yaw moment Mvn is great, the major axis La becomes small. The minor axis Lb is variably set in accordance with the magnitude of the rate of change of the target braking/driving force Fvn in such a manner that, as the magnitude of the rate of change of the target braking/driving force Fvn is great, the minor axis Lb becomes small. Therefore, as the fear of sharply increasing or decreasing the vehicle yaw moment or braking/driving force is high, the limitation to the vehicle target yaw moment Mvt after the modification and the target braking/driving force Fvt after the modification is made strict, whereby under the condition in which the acceleration/deceleration operation and steering operation by a driver are gentle, the yaw moment and braking/driving force required to the vehicle is surely applied, and under the condition in which the acceleration/deceleration operation or steering operation by a driver is sharp, the sharp variation in the vehicle yaw moment and braking/driving force can surely be prevented. Further, this configuration can surely reduce the degree of the changes in the vehicle yaw moment and/or braking/driving force when the speed in the acceleration/deceleration operation or steering operation by a driver sharply changes, compared to the case in which the major axis La and the minor axis Lb are constant.

According to the illustrated first and second embodiments, the vehicle target longitudinal acceleration Gxt is calculated on the basis of the accelerator opening φ and the master cylinder pressure Pm that indicate the amount of acceleration or deceleration operation by a driver, the vehicle target yaw rate γt is calculated on the basis of the steering angle θ, which is a steering operation amount by a driver, and the vehicle speed V, the target barking/driving force Fvn required to the vehicle is calculated on the basis of the vehicle target longitudinal acceleration Gxt, and the target total yaw moment Mvnt required to the vehicle is calculated on the basis of the vehicle target yaw moment γt.

The vehicle turning yaw moment Ms by the lateral force of each wheel is calculated, and the value obtained by subtracting the turning yaw moment Ms from the vehicle target total yaw moment Mvnt is calculated as the vehicle target yaw moment Mvn, which is required to the vehicle and is to be attained by the control of the braking/driving force of each wheel. Therefore, the vehicle target yaw moment required to the vehicle to be attained by the control of the braking/driving force of each wheel can be surely and correctly calculated in just proportion, compared to the case where the vehicle turning yaw moment Ms attained by the lateral forces of the wheels is not considered.

The present invention is explained in detail with respect to specific embodiments, but the invention is not limited to the above-mentioned embodiments. It would be apparent for a person skilled in the art that various other modifications are possible within the scope of the present invention.

For example, although the regenerative braking force is generated according to need by the electric motor generators 12FL to 12RR and the electric motor generator 40 in the aforesaid first and second embodiments, it may be revised such that the regenerative braking is not performed, even if the driving source is an electric motor generator, and the braking force is generated only by the friction braking.

The longitudinal distribution ratio Kr of the braking/driving force to the rear wheels is constant in the aforesaid first and second embodiments. However, the longitudinal distribution ratio Kr to the rear wheels may be variably set in accordance with the magnitude of the steering angle such that the longitudinal distribution ratio Kr to the rear wheels gradually increases as the magnitude of the steering angle increases, since in general, the lateral force of the steerable wheel increases and the allowable longitudinal force of the steerable wheel decreases as the magnitude of the steering angle increases.

In general, as the braking forces of the rear wheels increase upon the braking of the vehicle for deceleration, the lateral force of the rear wheels decreases to thereby deteriorate the running stability of the vehicle. Therefore, the longitudinal distribution ratio Kr to the rear wheels may be variably set in accordance with the vehicle target braking/driving force such that it decreases as the vehicle target braking/driving force takes a negative value and its magnitude is greater.

In the above-mentioned first and second embodiments, when the vehicle target braking/driving force Fvn and the vehicle target yaw moment Mvn are outside the range of the quadrangle 100 or hexagon 104 that indicates the vehicle target braking/driving force Fvn and the vehicle target yaw moment Mvn that can be achieved by the control of the braking/driving forces of the wheels, the point of intersection Q1 of the segment L, which links the point P that shows the vehicle target braking/driving force Fvn and the vehicle target yaw moment Mvn and the origin O, and the outer line of the quadrangle 100 or the hexagon 104 is obtained as the first target point. However, the first target point Q1 may be obtained in an optional manner, so long as it is as closer to the vehicle target braking/driving force Fvn and the vehicle target yaw moment Mvn as possible and on the outer line of the quadrangle 100 or the hexagon 104. In this case, the second target point Q2 may be obtained as a point of intersection of a segment L, which links the first target point Q1 and the origin O, and the ellipse 102.

According to the first and second embodiments, the major axis La and the minor axis Lb of the ellipse 102 are variably set in accordance with the road friction coefficient, and variably set in accordance with the magnitude of the rate of change of the target yaw moment Mvn and the magnitude of the rate of change of the target braking/driving force Fvn, respectively. However, a switch serving as vehicle responsiveness setting means that is operated by an occupant of the vehicle and that can variably set the vehicle responsiveness to the driving operation may be provided, wherein the diameter of the ellipse may be variably set in accordance with the vehicle responsiveness set by the switch in such a manner that, when the vehicle responsiveness set by the switch is high, the diameter of the ellipse becomes great, compared to the case in which the vehicle responsiveness set by the switch is low.

The embodiments may be revised such that the necessity of the achievement of the target braking/driving force is determined in accordance with the driving operation by an occupant, wherein when the necessity of the achievement of the target braking/driving force is high, the diameter of the ellipse in the direction along the coordinate axis of the braking/driving force is increased so as to reduce the degree of the modification of the target braking/driving force by the ellipse, compared to the case in which the necessity of the achievement of the target braking/driving force is low. Similarly, the embodiments may be revised such that the necessity of the achievement of the target yaw moment is determined in accordance with the driving operation by an occupant, wherein when the necessity of the achievement of the target yaw moment is high, the diameter of the ellipse in the direction along the coordinate axis of the yaw moment is increased so as to reduce the degree of the modification of the target yaw moment by the ellipse, compared to the case in which the necessity of the achievement of the target yaw moment is low.

In these cases, when the magnitude of the amount of the steering operation by an occupant and the magnitude of its rate of change are small, the degree of the modification of the target braking/driving force by the ellipse may be reduced, compared to the case in which the magnitude of the amount of the steering operation by an occupant and the magnitude of its rate of change are great. Alternatively, when the magnitude of the amount of the acceleration/deceleration operation by an occupant and the magnitude of its rate of change are great, the degree of the modification of the target braking/driving force by the ellipse may be reduced, compared to the case in which the magnitude of the amount of the acceleration/deceleration operation by an occupant and the magnitude of its rate of change are small. Further, when the magnitude of the amount of the acceleration/deceleration operation by an occupant and the magnitude of its rate of change are small, the degree of the modification of the target yaw moment by the ellipse may be reduced, compared to the case in which the magnitude of the amount of the acceleration/deceleration operation by an occupant and the magnitude of its rate of change are great. Alternatively, when the magnitude of the amount of the steering operation by an occupant and the magnitude of its rate of change are great, the degree of the modification of the target yaw moment by the ellipse may be reduced, compared to the case in which the magnitude of the amount of the steering operation by an occupant and the magnitude of its rate of change are small.

In the aforesaid first and second embodiments, the target braking/driving force Fvn and the target yaw moment Mvn by the control of the braking/driving force of each wheel required to the vehicle are calculated on the basis of the amount of the acceleration or deceleration operation and the amount of the steering operation by the driver. However, in case where the vehicle behavior is unstable, the target braking/driving force Fvn and the target yaw moment Mvn may be corrected so as to be calculated by considering the target longitudinal acceleration or target yaw rate, which are required to stabilize the behavior of the vehicle, in addition to the amount of the acceleration or deceleration operation and the amount of the steering operation by the driver.

In the aforesaid second embodiment, the lengths of the diameters of the ellipse 102 along the braking/driving force Fv at both sides of the origin, i.e., the diameter at the side of the driving force and the diameter at the side of the braking force are equal to each other. However, in case where the magnitude of the maximum driving force Fvdmax and the magnitude of the maximum braking force Fvbmax are different from each other, the lengths of the diameters of the ellipse 102 at both sides of the origin may be set to different values in accordance with the magnitude of the maximum driving force Fvdmax and the magnitude of the maximum braking force Fvbmax.

What is claimed is:

1. A vehicle braking/driving force control apparatus comprising:
    braking/driving force applying device configured to apply braking/driving forces to wheels;
    means for detecting an amount of driving operation by an occupant;
    means for calculating a vehicle target braking/driving force and a vehicle target yaw moment, generated by the braking/driving forces of the wheels, on the basis of at least the amount of the driving operation by the occupant;
    modifying means for modifying said target braking/driving force and/or said target yaw moment, when said target braking/driving force and/or said target yaw moment cannot be achieved by the braking/driving forces of the wheels; and
    control means for controlling the braking/driving force applied to each wheel by said braking/driving force applying device such that the vehicle braking/driving force and a yaw moment by the braking/driving forces of the wheels become said target braking/driving force after the modification and said target yaw moment after the modification,
    wherein said modifying means modifies said target braking/driving force and/or said target yaw moment to values, in a rectangular coordinate in which the vehicle braking/driving force and the yaw moment are defined as coordinate axes, that are (1) within a range of the vehicle braking/driving force and the vehicle yaw moment attainable by the braking/driving forces of the wheels and (2) within an ellipse which has its center on the coordinate axis of the vehicle braking/driving force of said rectangular coordinate and has a major axis and minor axis aligning with the directions of the coordinate axes of said rectangular coordinate.

2. A vehicle braking/driving force control apparatus according to claim 1, wherein
    said ellipse crosses each side of a polygon that defines the range of the vehicle braking/driving force and the vehicle yaw moment attainable by the braking/driving forces of the wheels.

3. A vehicle braking/driving force control apparatus according to claim 1, wherein the diameter of said ellipse is variably set in accordance with a road friction coefficient such that, when the road friction coefficient is small, the diameter of the ellipse becomes smaller compared to the case where the road friction coefficient is great.

4. A vehicle braking/driving force control apparatus according to claim 1, wherein
the diameter of said ellipse is variably set in accordance with a rate of change of said target braking/driving force and/or a rate of change of said target yaw moment in such a manner that, when a magnitude of a rate of change of said target braking/driving force and/or a magnitude of a rate of change of said target yaw moment are great, the diameter of the ellipse becomes smaller than that in the case in which the magnitude of the of the rate of change of said target braking/driving force and the magnitude of the rate of change of said target yaw moment are small.

5. A vehicle braking/driving force control apparatus according to claim 1, wherein
when a magnitude of an amount of a steering operation by an occupant and its rate of change are small, said modifying means reduces a degree of the modification of the target braking/driving force by the ellipse, compared to the case in which the magnitude of the amount of the steering operation by an occupant and its rate of change are great, and alternatively, when a magnitude of an amount of the acceleration/deceleration operation by an occupant and its rate of change are great, said modifying means reduces the degree of the modification of the target braking/driving force by the ellipse, compared to the case in which the magnitude of the amount of the acceleration/deceleration operation by an occupant and its rate of change are small.

6. A vehicle braking/driving force control apparatus according to claim 1, wherein
when a magnitude of an amount of the acceleration/deceleration operation by an occupant and its rate of change are small, said modifying means reduces a degree of the modification of the target yaw moment by the ellipse, compared to the case in which the magnitude of the amount of the acceleration/deceleration operation by an occupant and its rate of change are great, and alternatively, when a magnitude of an amount of a steering operation by an occupant and its rate of change are great, said modifying means reduces the degree of the modification of the target yaw moment by the ellipse, compared to the case in which the magnitude of the amount of the steering operation by an occupant and its rate of change are small.

7. A vehicle braking/driving force control apparatus according to claim 1, wherein
in a rectangular coordinate in which the vehicle braking/driving force and the yaw moment are defined as coordinate axes, with a point of intersection of a straight line linking a point indicating said target braking/driving force and said target yaw moment and the origin of a rectangular coordinate, and a line indicating greatest values of the vehicle braking/driving force and the yaw moment by the braking/driving forces of the wheels, being defined as a first target point, and a point of intersection of a straight line linking the point indicating said target braking/driving force and said target yaw moment and the origin of said rectangular coordinate, and said ellipse being defined as a second target point, said modifying means sets values at the point, closer to said origin, of said first and said second target points to said target braking/driving force after the modification and said target yaw moment after the modification.

8. A vehicle braking/driving force control apparatus according to claim 1, wherein
said means for calculating a vehicle target braking/driving force and a vehicle target yaw moment calculates said vehicle target braking/driving force and a vehicle target total yaw moment for causing the vehicle to stably run on the basis of at least the amount of the driving operation by an occupant, estimates a vehicle turning yaw moment due to a lateral force of each wheel on the basis of at least the amount of the driving operation by the occupant, and calculates said vehicle target yaw moment by subtracting said turning yaw moment from said target total yaw moment.

9. A vehicle braking/driving force control apparatus according to claim 4, wherein
the diameter of said ellipse aligning with the direction of the coordinate of the yaw moment is variably set so as to become smaller when the magnitude of the rate of change of said target braking/driving force is great, compared to the case in which the magnitude of the rate of change of said target braking/driving force is small.

10. A vehicle braking/driving force control apparatus according to claim 4, wherein
the diameter of said ellipse aligning with the direction of the coordinate of the braking/driving force is variably set so as to become smaller when the magnitude of the rate of change of said target yaw moment is great, compared to the case in which the magnitude of the rate of change of said target yaw moment is small.

11. A vehicle braking/driving force control apparatus according to claim 9, wherein
the vehicle comprises vehicle responsiveness setting means that variably sets a vehicle acceleration/deceleration and turning responsiveness to a acceleration/deceleration operation and steering operation made by an occupant, wherein the diameter of said ellipse is variably set in accordance with the vehicle responsiveness set by said vehicle responsiveness setting means in such a manner that, when the vehicle responsiveness set by said vehicle responsiveness setting means is high, the diameter of said ellipse becomes greater than that in case where the vehicle responsiveness set by said vehicle responsiveness setting means is low.

12. A vehicle braking/driving force control apparatus comprising:
braking/driving force applying device configured to apply braking/driving forces to wheels;
an accelerator opening angle sensor configured to detect an opening angle of an accelerator; and
a controller configured to calculate a vehicle target braking/driving force and a vehicle target yaw moment, generated by the braking/driving forces of the wheels, on the basis of at least the opening angle of the accelerator, configured to modify the target braking/driving force and/or the target yaw moment, when the target braking/driving force and/or the target yaw moment cannot be achieved by the braking/driving forces of the wheels, and configured to control the braking/driving force applied to each wheel by the braking/driving force applying device such that the vehicle braking/driving force and a yaw moment by the braking/driving forces of the wheels become the target braking/driving force after the modification and the target yaw moment after the modification, wherein the controller is configured to modify the target braking/driving force and/or the target yaw moment to values, in a rectangular coordinate in which the vehicle braking/driving force and the yaw moment are defined as coordinate axes, that are (1) within a range of the vehicle braking/driving force and the vehicle yaw moment attainable by the braking/driving forces of the wheels and (2) within an ellipse which has its center on the coordinate axis of the vehicle braking/driving force of the rectangular coordinate and has a major axis and minor axis aligning with the directions of the coordinate axes of the rectangular coordinate.

* * * * *